United States Patent [19]

White

[11] Patent Number: 4,870,519

[45] Date of Patent: Sep. 26, 1989

[54] UNIFORM FLYING HEIGHT SLIDER ASSEMBLY WITH IMPROVED DYNAMIC AIR BEARING CHARACTERISTICS

[76] Inventor: James W. White, 135 Olive Ave., Los Gatos, Calif. 95030

[21] Appl. No.: 123,398

[22] Filed: Nov. 20, 1987

[51] Int. Cl.$^4$ .............................................. G11B 5/60
[52] U.S. Cl. .................................................... 360/103
[58] Field of Search ........................................ 360/103

[56] References Cited

U.S. PATENT DOCUMENTS 4,673,996  6/1987  White ................................... 360/103
4,757,402  7/1988  Mo ....................................... 360/103

OTHER PUBLICATIONS

IEEE Trans on Magnetics, Sep. 1986; Uniform Flying Height Rotary Actuated Air Bear'g Slider; J. White.

Primary Examiner—A. J. Heinz
Attorney, Agent, or Firm—Pitts and Brittian

[57] ABSTRACT

A slider assembly for flying a magnetic head at very low clearances on a fluid film over a moving recording medium. This improved slider assembly provides stability and uniformity of flying height and increased damping characteristics when the slider assembly is subjected to dynamic forces. The slider assembly has, in most embodiments, a pair of rails each having a tapered forward end to provide a converging inlet to achieve the fluid film. Most of the static load is carried by the flat surface of the rails rearward from that tapered forward end. Each rail of the slider assembly has at least one longitudinal transverse pressurization contour (TPC) along corresponding edges of the rails to provide this stability of flying height. When only one TPC per rail is used, the particular edge chosen for the TPC depends upon the disk size and skew angle distribution over the recording zone. The TPC's can be of step construction, a linear taper or a convex configuration. For each, the "average" angle as determined by the height and width of the TPC is about 0.05 to about 5 degrees.

27 Claims, 7 Drawing Sheets

UNIFORM FLYING HEIGHT SLIDER ASSEMBLY WITH IMPROVED DYNAMIC AIR BEARING CHARACTERISTICS

DESCRIPTION

1. Technical Field

This invention relates generally to magnetic head slider assemblies for use in magnetic read/write systems employing rapidly moving recording media, and more particularly to a slider assembly which produces an air bearing characteristic of improved uniformity of flying height and dynamic response as the slider is skewed or is subjected to various dynamic forces as it moves relative to the recording media.

2. Background Art

As discussed in my recently issued U.S. Pat. No. 4,673,996 (referred to hereinafter as my '996 patent), issued June 16, 1987, magnetic recording systems utilizing transducers that are supported by an air bearing film as they move relative to the surface of a magnetic recording disk are well know in the art. Such transducers "fly" at just a few micro-inches above a rotating disk surface. The transducer is mounted in a slider assembly which has a contoured lower surface toward the recording medium. The air bearing film is produced by pressurization of the air as it flows between the disk and slider and is a consequence of the slider contour and relative motion of the two surfaces. The purpose of the air bearing is to provide, with minimal contact, a very narrow clearance between the slider and rotating disk. This allows a high density of magnetic data to be transferred and reduces the wear and damage to the magnetic assembly and recording medium during operation.

Typical sliders of the prior art utilize at least two lower rails having flat surfaces toward the recording medium, each of these rails having a tapered forward surface toward the direction of rotation of the recording medium, whereby the rotating medium forces air by viscous effects into the taper and thereby produces a pressure beneath each of the rails resulting in the air bearing. These sliders are typically gimbal mounted to a flexure which is attached to an arm. The arm is driven by an actuator which positions the transducer over the recording surface from one data track to another. The arm can move in a linear motion which is termed linear access or it can rotate which is termed rotary access. With rotary access, the slider will be positioned at varying angles with respect to the direction of disk rotation as the slider moves over the recording surface. This angular orientation is referred to as the "skew" angle.

When a typical slider is positioned having any angular skew, the rotation of the disk introduces pressurized air at the forward edge, thereby generating the air bearing. However, this air is pressurized at a reduced value because of the skew, and gives rise to a reduction in the flying height. Also, the skew angle gives rise to a roll of the slider such that the air bearing flying height is not uniform under both of the rails. Accordingly, the position of the transducer with respect to the recording medium can vary as the slider is caused to roll in one direction or the other or fly at different heights. Such variations in flying height adversely affect the data transfer between transducer and recording medium. Furthermore, the slider must move radially across the recording disk at a substantial rate of speed to access various portions of the disk. This motion also introduces air under one edge of each slider rail and results in a roll of the slider and a change in the spacing between the transducer and the recording medium. When any of these variations of spacing occur, particularly with a substantially reduced spacing between the slider and the disk, contact may occur between the slider (and its transducer) and the recording medium, or at least potentially rough surfaces thereof. Any such contact, of course, introduces wear into the slider and the recording surface.

In addition to my above-cited '996 patent, numerous magnetic head slider assemblies have been developed in the rapidly developing art of high speed recording/reading. Typical of these developments is the transducer assembly described in U.S. Pat. No. 3,823,416, issued to M. W. Warner on July 9, 1974. In this particular construction, there are two principal side rails having tapered front edges that produce the air film necessary to raise the transducer assembly above the recording medium. In addition, there is a center rail to which the transducer is attached at a trailing edge. By positioning the transducer along this center rail, the effects of roll upon the spacing of the transducer from the recording medium is minimized.

Another magnetic head slider assembly is that described in my U.S. Pat. No. 3,855,625, issued on Dec. 17, 1974. In this patent is described a slider support for a magnetic head assembly that is formed with a tapered flat or step flat forward edge on the outer rails, with a recessed portion delineated by a reverse step between the rails. This construction affects the air bearing to improve upon the stability and uniformity of flying height of the magnetic head of the device.

Another device in this general field is described in U.S. Pat. No. 4,218,715, issued to M. F. Garnier on Aug. 19, 1980. In this patent is taught the use of a negative pressure region between the rails and shallow recesses or reliefs formed in the rails so that the ambient pressure is substantially maintained in the areas of such recesses along the rails. This slider is alleged to be relatively insensitive to skew and disk curvature due to flutter or static deformation.

Still another device is described in U. S. Pat. No. 4,285,019, issued to J. C. Scott, et al., on Aug. 18, 1981. The slider of this patent is manufactured to have a substantially continuous curved surface from the front to the back of the slider rather than a planar surface as in other of the above-cited devices. With this construction, it is alleged that the trailing edge, by being along a curve, is better protected from making contact with the recording medium during operation or start/stop conditions, thereby minimizing damage to the transducer. This patent also teaches that a continuous curvature can exist across the slider as would be produced by machining the entire lower surface of the slider to a spherical contour.

Still another patent of this technology is U.S. Pat. No. 4,475,135, issued to M. W. Warner, et al., on Oct. 2, 1984. The slider of this patent has a continuously tapered surface across the front edge thereof to pressurize the air, a pair of axially extending rails, and an area between the two that is recessed to provide a region of negative pressure. This construction is alleged to provide an extremely fast lift off of the slider from the disk surface as the disk begins to rotate. Thus, minimum wear occurs during initial startup and stopping of the disk.

Although several of the above-referenced patents acknowledge the existence of a roll of the slider during operation, none of them, except for my '996 patent, appears to address the problem of preventing such roll.

According to the teaching of my above-cited 996 patent, a reduction of roll and flying height variations is achieved by providing both longitudinal edges of each rail with a transverse pressurization contour (TPC); i.e., a contour whereby pressurization is produced in the contour at one transverse edge of the rail and expansion is produced in the contour along the other transverse edge of the rail when there is a transverse component of airflow across the face of the rail. When a pair of rails are used, the patent calls for TPC's along the side edges of both rails. This arrangement provides flying height uniformity and control when the skew angle varies considerably with a near even split (negative to positive) from an inside track to an outside track (e.g. $-15$ degrees to $+15$ degrees). There are also disk configurations and skew arrangements that do not lend themselves to flying height uniformity with the inclusion of TPC sections along each side edge of each rail. For example, consider a $3\frac{1}{2}$ inch disk spinning at 3600 rpm. With a near zero skew angle at the inside radius and moderate positive skew (such as $+15$ degrees) at the outside radius, a conventional taper-flat slider without TPC sections will increase moderately in flying height across the data band. Addition of TPC sections along each rail side edge in this case will not provide a more uniform flying height profile. In fact, TPC's along both edges would produce a flying height profile with greater variation, since the primary influence of the TPC sections is to produce more lifting support to the slider at a skewed orientation. This is in contrast to a desire for a more uniform flying height profile across the data band of a data storage disk.

Accordingly, it is a principal object of the present invention to provide a highly controlled thin pressurized film of air between the magnetic assembly and the spinning magnetic disk.

It is a further object of the present invention to provide an improved magnetic head air bearing slider for magnetic recording systems that displays a high degree of insensitivity of clearance and roll angle to the slider skew.

It is another object of the present invention to provide a slider whose flying height and roll angle are highly insensitive to slider access velocity.

It is also an object of the present invention to provide a slider that exhibits a rapid lift off from the disk surface when rotation is started with the slider in a skewed position in contact with the disk.

It is another object of the present invention to provide a slider processing substantial ability to satisfactorily perform without contact by roughness on the disk surface during skewed slider orientation and/or rapid slider access over the recording medium.

A further object of the present invention is to provide a slider assembly with increased air bearing damping which improves its stability of motion and which allows the slider to settle more quickly after being subjected to impulse loading or other forces.

Also an object of the present invention is to provide a slider assembly with a high degree of insensitivity of clearance and roll angle to radial position on the magnetic disk as both the skew angle and disk velocity vary.

Another object of the present invention is to provide a magnetic head air bearing assembly that exhibits a substantially uniform flying height when a zero skew angle exists at either an inner or outer radius of the magnetic disk, and a substantial skew angle exists at the opposite extreme radius of the disk.

It is an additional object of the present invention to provide a slider that is easy to manufacture and which does not require a significant increase in cost over the conventional slider assemblies that are presently in use.

Other objects of the present invention will become apparent upon consideration of the drawings set forth hereinafter, and a complete discussion of the invention with respect to those drawings.

DISCLOSURE OF THE INVENTION

According to the present invention, an air bearing surface of a magnetic head air bearing slider is described by two or more coplanar rails extending rearwardly from a forward edge and separated by an ambient pressure relief slot. Each air bearing rail is sloped at its forward edge so as to pressurize incoming air flow to produce lift for the slider assembly. Furthermore, each of the rails is provided with an edge contour along at least one edge (a corresponding side edge of the rails). These edge contours are referred to as transverse pressurization contours (TPC). Depending upon the disk size and relationship of the skew angle between an inner radius and an outer radius of the magnetic disk, the edge selected for the contour is such that the air bearing formed between the slider and the recording medium is not degraded by slider skew angle or access velocity. This results in very little roll and very little tendency to change the flying height due to skew or access, and provides rapid lift off when the slider is in a skewed position relative to the direction of rotation of the recording disk. This permits a wider range of skew angles, and a higher access velocity than can be utilized without the advantages produced by the present invention. The TPC's can have various configurations; however, each configuration has an average angle with respect to the bottom of the rails of about 0.05 to about 5.0 degrees.

BEST MODE FOR CARRYING OUT THE INVENTION

Figure 1:
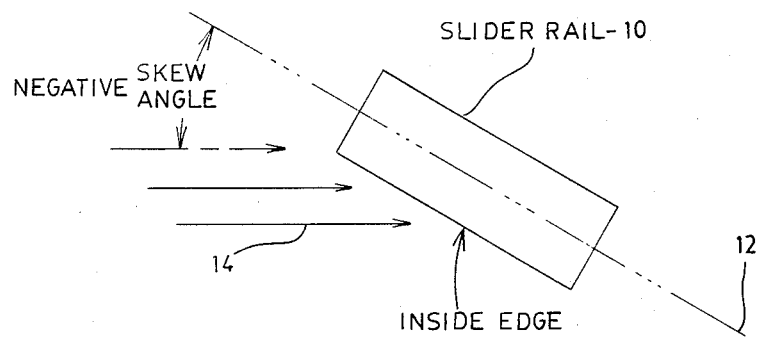
FIG. 1 is a drawing illustrating skew angle as applied to a magnetic head slider assembly, i.e., the included angle between the direction of disk velocity and the -longitudinal axis of the slider.

As stated above, the angular relationship between the longitudinal axis of a magnetic head slider and the direction of movement of the magnetic disk is referred to as "skew angle". This relationship is illustrated in FIG. 1. The slider can be pivotally positioned such that a slider rail 10 has a zero skew angle between the longitudinal axis 12 thereof and the direction 14 of movement of recording medium. This mounting can result in a positive or negative skew angle as the slider head is accessed to the maximum radius of the disk. Similarly, the slider can be pivotally mounted such that the skew angle is zero at the outer radius of the disk, with a resulting positive or negative skew angle at the inner radius. A slider can also be pivotally mounted to provide approximately equal skew angle magnitudes at the minimum radius and outer radius.

Figure 2:
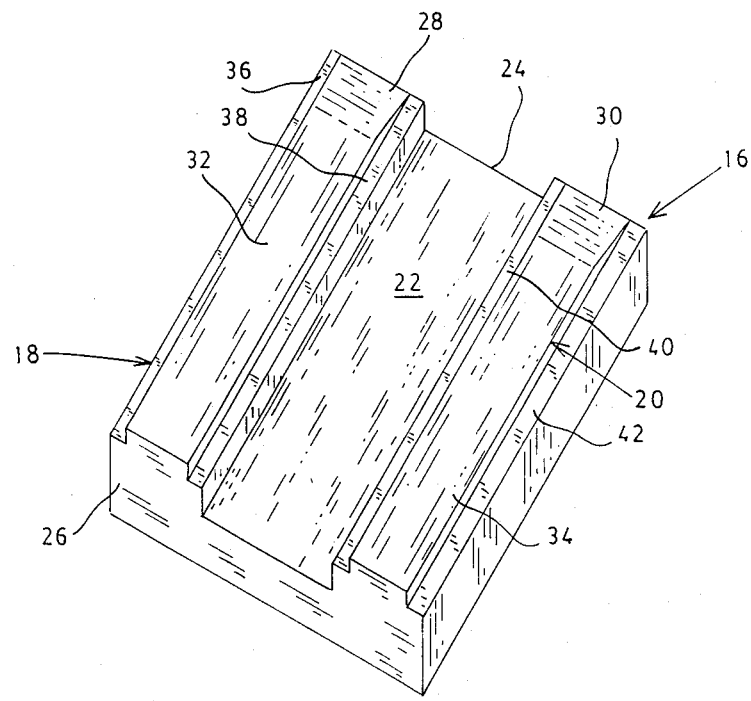
FIG. 2 is an isometric bottom view of a typical slider assembly according to my above-cited patent wherein transverse pressurization contains are provided along both edges of the slider rails.

The slider head, illustrated in FIG. 2, is typical of the invention set forth in my above-identified U.S. Pat. No. 4,673,996 which is incorporated herein by reference. In this and other drawings depicting embodiments of the invention, the units are enlarged and not necessarily to scale in order to better show the transverse pressurization contours. This slider assembly is indicated generally at 16. In this embodiment, there are a pair of rails 18, 20 separated by a deeply recessed region 22 in a substantially conventional manner. This recessed area prevents the entire body from providing an air bearing support and thus allows for low flying heights when low or moderate loads are applied to the slider. The slider 16 has a forward or leading edge 24 and a rear or trailing edge 26. Each of the rails 18, 20 consist of a converging inlet slope 28, 30, respectively, leading to a substantially flat air bearing surface 32, 34, respectively. Further, the air bearing surface 32 is provided with transverse pressurization contours 36, 38; and air bearing surface 34 is provided with transverse pressurization contours 40, 42. This type of slider is referred to hereinafter as a Type III slider. Typically, the converging inlet slope has a linear taper at an angle of about 0.5 to about 2 degrees with respect to the bearing surfaces 32, 34. The TPC can be defined as having an "average angle" with respect to the air bearing surface. For this step-type TPC, this average angle, $\theta$, can be determined from the equation: $\tan \theta = B/C$, where B is the height of the step and C is the width of the step (see FIG. 6). As described in greater detail hereinafter, this average angle can vary from about 0.05 to about 5 degrees.

During operation of a system employing these sliders, most of the static load developed by a rail is carried by the central flat portion (i.e., surfaces 32, 34) of each rail. When the slider is subjected to dynamic forces which cause the slider to translate, pitch or roll, the effective width of the slider rail enlarges to include most of the width of the TPC sections as well. This increased effective air bearing surface area provides more support to the slider during dynamic excursions and allows the slider to settle more quickly after being subjected to such dynamic forces. Examples of these dynamic forces which alter the slider static flying orientation include those associated with: rapidly accessing the slider (and magnetic head) from one data track to another; non-flat run-out conditions on the disk which causes the slider to come in close proximity to the disk; etc. Localized asperities on the disk which disturb the air film between the slider and the disk are problems to the stability of the slider, also. Depending on the size, shape and distribution of such asperities, the slider may or may not perform satisfactorily.

One desired characteristic o the slider is to quickly return to equilibrium position after an encounter with disk disturbance or due to access motion radially across the disk. Such decreased settling time enhances the stability of the slider and minimizes the possibility of a "head crash" of the slider into the disk as the slider is repeatedly subjected to dynamic input. This damping feature was not fully recognized at the time of filing the application for my above-cited patent.

Figure 9:
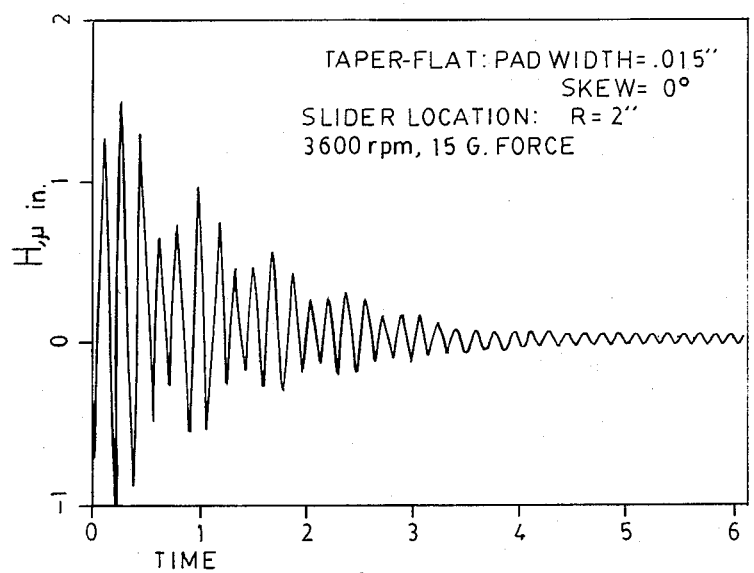
FIG. 9 is a computer generated simulation of flying height variation after subjecting a slider head assembly to a selected vertical impulse. This slider had no transverse pressurization contours.
Figure 10:
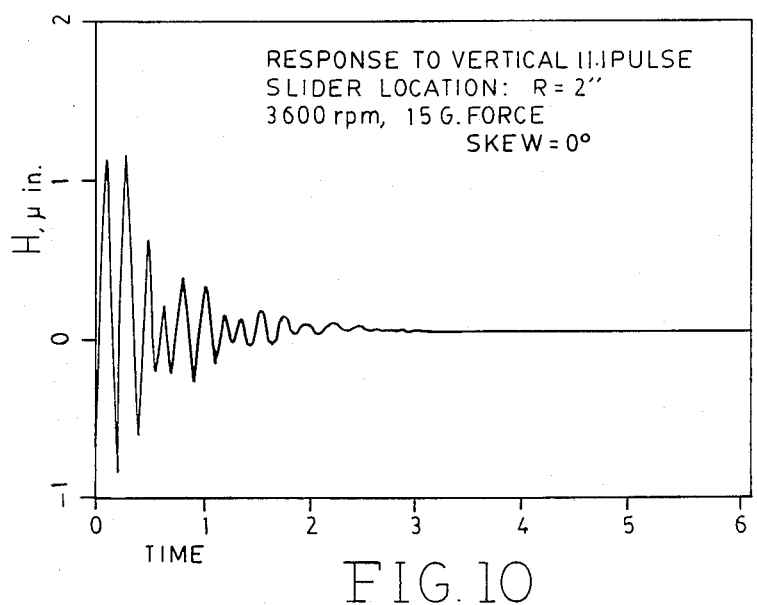
FIG. 10 is a computer generated simulation of flying height variation after subjecting a slider head assembly to the same vertical impulse as for the slider used for FIG. 9; however, significant damping of oscillations is achieved due to transverse pressurization contours.

Two plots showing the effect of damping can be seen in FIGS. 9 and 10. These plots were generated by computer simulation. The simulation is based on a theory which includes three degrees of freedom for the slider motion and isothermal compressibility and molecular slip for the air film. The air film is thus viscous, compressible and slightly rarefied. The plot in FIG. 9 is for a conventional taper-flat rail having a pad width of 0.015 inch; and that in FIG. 10 is for a similar rail having a TPC section along each edge. The sliders were each subjected to the same vertical impulse. In each case, the slider overall dimensions, load force, mass and moments of inertia were the same. Also, the static minimum flying heights were the same. For each slider, the dimensionless change in flying height, H, is plotted versus the dimensionless time, T, (the time value of unity corresponds to the time required for a point on the disk surface to travel the length of the slider). It can be seen that the TPC slider quickly returns to equilibrium in contrast to a non-TPC slider indicating significantly increased damping to impulse. These results are for a slider flying at a height of about six micro-in cheso above a 5¼ inch disk rotating at 3600 rpm.

Figure 12:
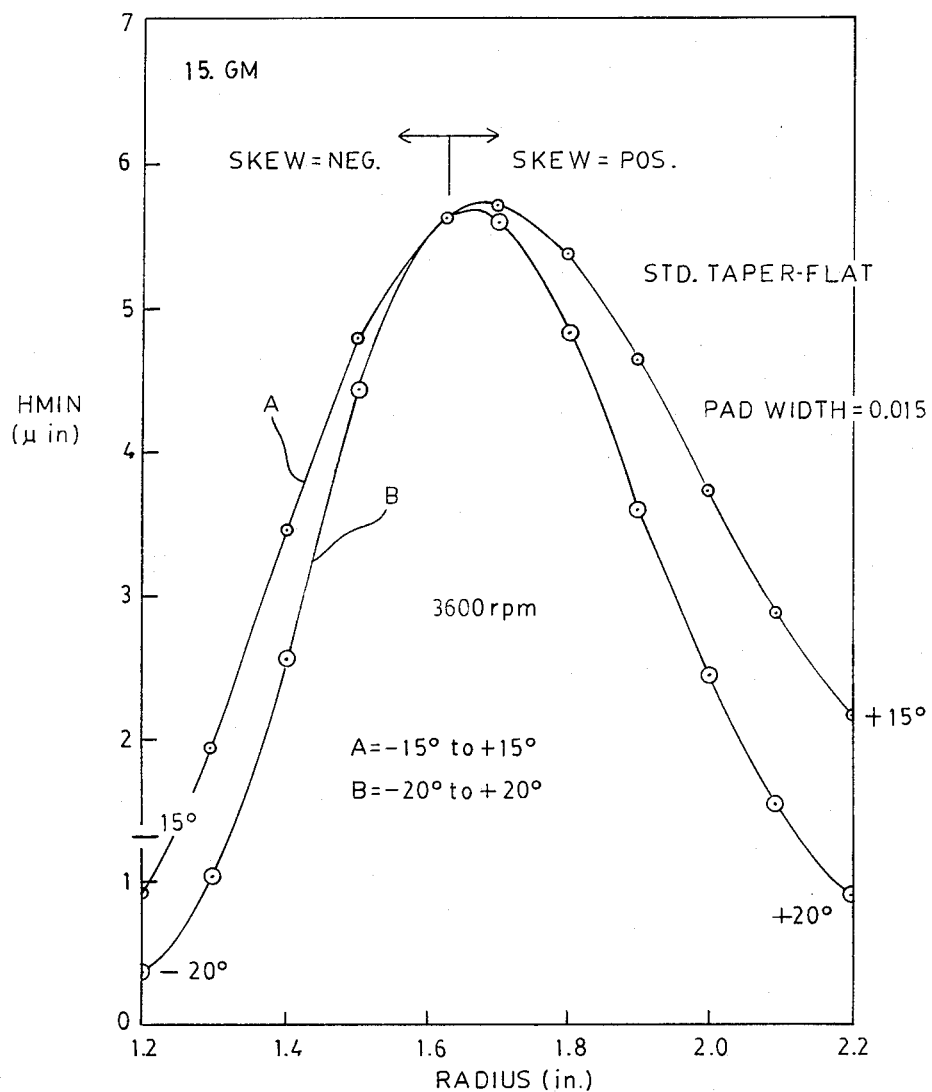
FIG. 12 is a plot, as obtained by computer simulation, of flying height variation or profiles for a conventional taper-flat slider assembly without transverse pressurization contours when the skew angle magnitude is approximately equal at inside and outside radius. The results for two cases are plotted.
Figure 13:
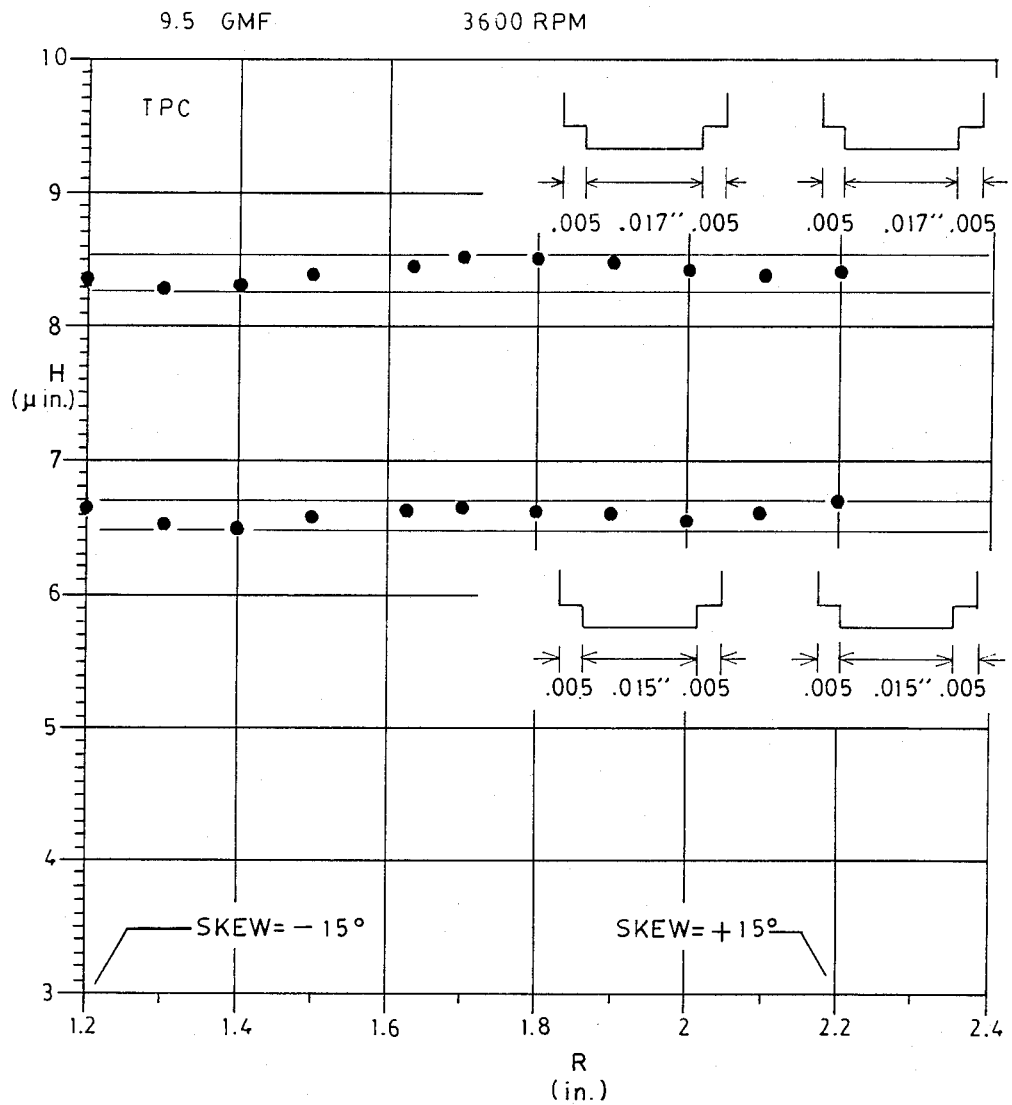
FIG. 13 is a plot, as obtained by computer simulation of flying height variation for a slider incorporating TPC step sections along each side edge of the two rails. The skew angle magnitude is equal at inside and outside radius.

The provision of a TPC along each edge of each rail provides, as stated in my cited '996 patent, improvement in flying height uniformity and low roll angle. During slider access in one direction, the TPC along the rail in that direction provides support. The TPC along the opposite edge provides support when the access motion is in that opposite direction. In many situations, the Type III slider also provides static flying height uniformity when there is a substantial balance in the skew angle (positive and negative) from the inner radius of the recording medium to the outer radius. The degree of static flying height uniformity possible with a Type III slider is influenced primarily by the disk size, the skew angle distribution across the recording band, and the desired static flying height. With a 5¼ inch or larger disk and substantial negative to positive skew angle variation across the recording band, the static flying height tends to increase, reach a maximum, and then decrease from inside to outside radius (see FIG. 12) for the case of a typical taper-flat slider without TPC sections. By incorporating TPC sections along both side edges of each rail, the static flying height can be controlled to a near constant value across the data band. In order to achieve a uniform flying height with radius, the average angle of the TPC sections on each rail are usually different. Typically, the average angle for the TPC section along the inside edge of each rail is between ¼ to ½ that for the TPC section along each outside edge. Flying height profiles are presented on FIG. 13 for the case where TPC step sections are utilized along each side edge of a two rail slider. Steps along the inside edges are one micron deep while those along the outside edges are three microns deep.

With a 3½ inch or smaller disk spinning at 3600 rpm, there is more of a tendency for the static flying height to increase monotonically with disk radius. This is caused primarily by the decreased tangential velocities associated with the smaller disk. In order to achieve a given flying height level, the slider rail widths will generally be greater than those used with a larger disk. This causes the static flying height to increase across the recording band (as the velocity changes) even though the skew angle may be substantial and vary considerably. That is, with a 3½ inch disk, the static flying height is more sensitive to velocity change than the case with a 5¼ inch disk. This variation in flying height sensitivity with disk size then requires a variation in TPC distribution in order to provide static flying height uniformity over the recording band of some small disk applications.

Due to the influences cited above, there are disk and skew configurations in which a TPC section along only a single corresponding side edge of each rail may be adequate or even required for control of static flying height and roll angle across the recording band. One such configuration occurs when the skew angle is near zero at the inside radius and significantly non-zero at the outside radius. As an example, consider a 3½ inch diameter disk spinning at 3600 rpm. The inside skew angle can be zero while the outside skew angle can be +15 degrees. A conventional taper-flat slider such as is found in current disk drives increases moderately in static flying height from inside to outside radius. If TPC sections of the same size and geometry were utilized along each side edge of the slider, the flying height would increase more across the recording zone than for the slider with no TPC sections. However, by including a TPC section only along the inside longitudinal edge of each rail (i.e., the edge closer to the center of disk rotation), the flying height can be controlled at a nearly constant value from inside to outside disk radius. In this case, the TPC sections produce subambient pressure which increases in magnitude as the skew angle (and radius) increases. This effect causes the slider to be attracted toward the disk and provides a more uniform flying height profile across the recording band. With this particular disk size and skew distribution, a nearly uniform flying height profile can only be produced with the single TPC section per rail.

An example where near uniform static flying height may be achieved with either single or dual TPC sections occurs with a 5¼ inch disk at 3600 rpm and a skew angle which varies from zero at the inside track radius to +20 degrees at the outside radius. In this case, most of the flying height augmentation is provided by the TPC sections along the rail outside edges as they produce pressurization and lift.

Figure 3:
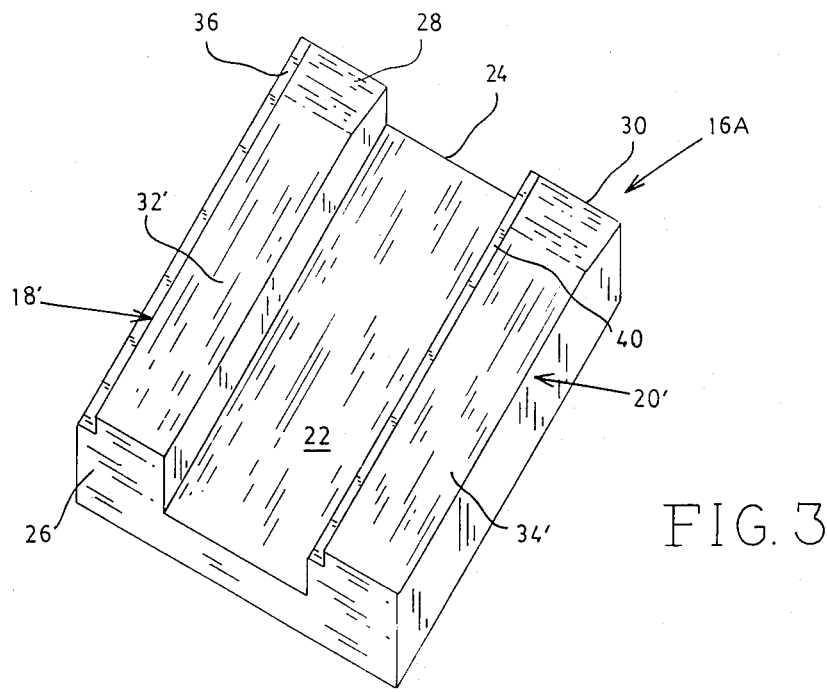
FIG. 3 is an isometric bottom view of one embodiment of the present invention showing the application of a transverse pressurization contour as applied to one corresponding side edge of each of the rails of the slider assembly.

A modified slider having one TPC per rail is illustrated at 16A in FIG. 3. This embodiment is designated as Type I slider. There are a pair of rails 18', 20' separated by the deep recess 22. The forward ends of the rails are each provided with converging inlet slopes 28, 30. Each rail 18', 20' is provided with a single TPC, i.e., 36, 40, respectively. These are on corresponding edges of the rails, 18', 20', as shown, and are in those edges toward the center of rotation of a recording disk when there is substantially zero skew angle at the inner radius of the disk and a large positive skew angle at a maximum radius. Typical step heights are 0.00002 to 0.0002 in., and typical widths are about 0.005 in. However, other step sizes can be used. The remaining flat region is typically 0.015 to 0.02 in. As stated above, the average angle defined by the step TPC is about 0.05 to about 5 degrees.

Figures 6, 7:
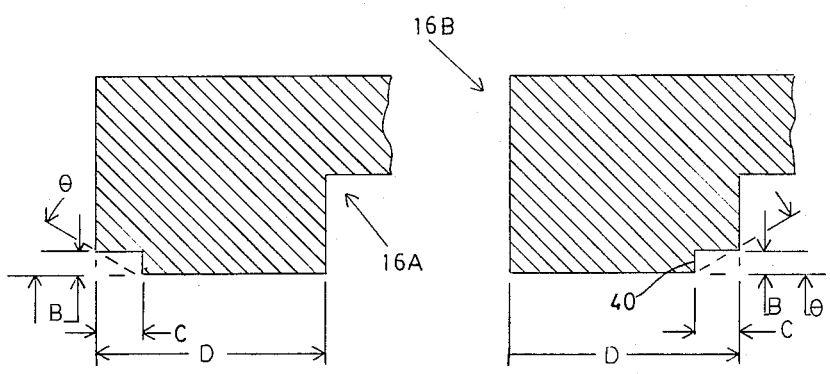
FIG. 6 is a transverse cross-section of one rail of a slider assembly illustrating still another configuration of a single transverse pressurization contour.
FIG. 7 is a transverse cross-section of one rail of a slider assembly illustrating the same configuration of transverse pressurization contour as shown in FIGS. 3 and 6 except that it is along an opposite edge-of the rail.

Shown in FIG. 7 at 16B is a slider designated as a Type II slider. In this embodiment, the TPC's, e.g 40, are on opposite edges of the rails 18', 20', as compared with FIG. 3, when there is zero skew angle at the inner radius of the disk and a large negative skew angle at the outer radius.

The following table illustrates the conditions for choosing between a Type I and Type II slider.

TABLE

| I. D. Skew Angle | O. D. Skew Angle | Change of Flying Height Toward Outer Radius (Without TPC) | Slider Type Required For More Uniform Flying Height |
| --- | --- | --- | --- |
| Near Zero | Positive | Increase | I |
| Near Zero | Positive | Decrease | II |
| Near Zero | Negative | Increase | II |
| Near Zero | Negative | Decrease | I |
| Positive | Near Zero | Increase | II |
| Negative | Near Zero | Increase | I |

The step-type TPC's of FIGS. 2-3 can be manufactured by several conventional methods. For those units where the height of the step is small (small average angle) the step can be produced by ion milling or etching techniques. The deeper steps can be achieved by these techniques or by machining.

Figures 4, 5:
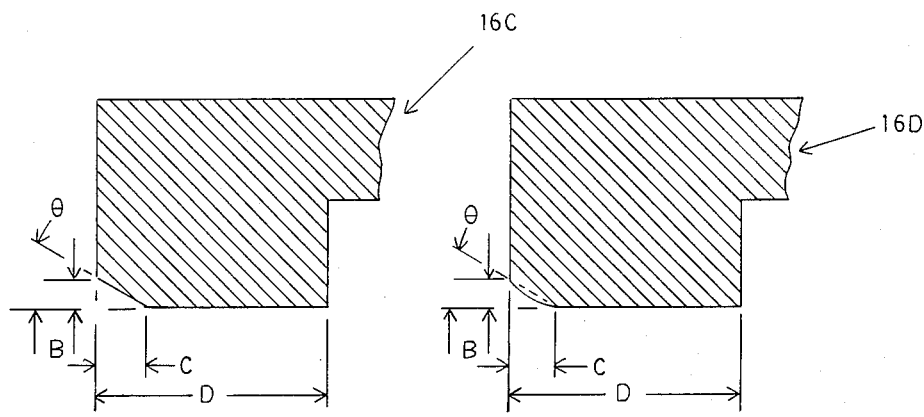
FIG. 4 is a transverse cross-section of one rail of a slider assembly illustrating one embodiment of a single transverse pressurization contour.
FIG. 5 is a transverse cross-section of one rail of a slider assembly illustrating another configuration of a single transverse pressurization contour.

Although step-type TPC's are relatively easy to manufacture; similarly, a TPC of a uniform taper as illustrated at 16C in FIG. 4 can be easily produced by lapping, etc. Such uniform tapers have an angle of also about 0.05 to about 5 degrees. In addition, these TPC's can have a convex configuration as disclosed in my above-cited '996 patent and illustrated at 16D in FIG. 5.

These configurations will also have an average angle, as computed above, of about 0.05 to about 5 degrees.

Figure 8:
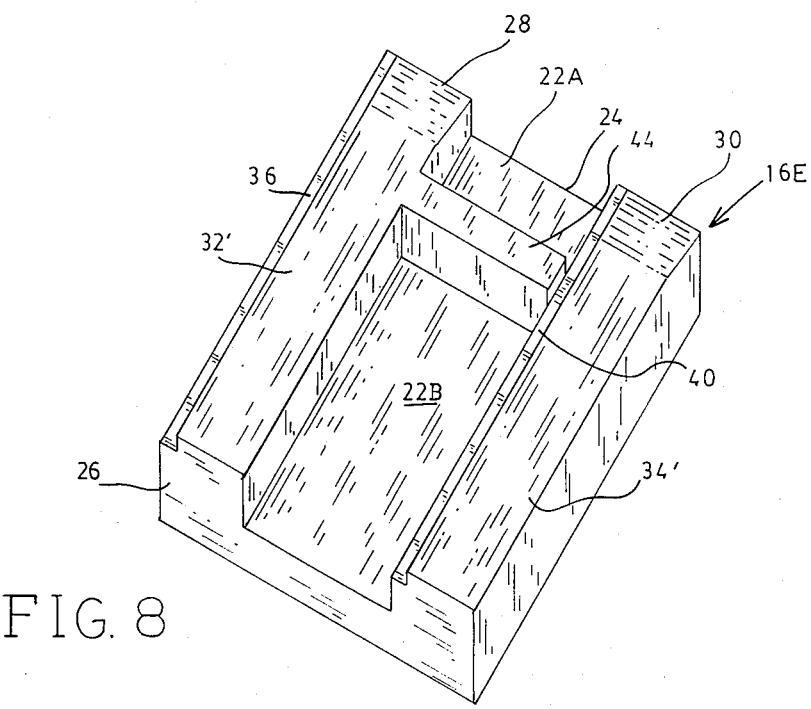
FIG. 8 is an isometric drawing showing the bottom surface of another embodiment of the slider assembly employing the transverse pressurization contour of FIG. 6.

In addition to the several variations of a single TPC per rail and a double TPC per rail, the sliders of the present invention can utilize other features often found in conventional sliders. One such configuration is illustrated at 16E in FIG. 8. This embodiment is similar to that of FIG. 2 except that a cross-bar 44 joins the two rails. Although each rail is illustrated as having a TPC along a single edge, a similar construction could have two TPC's per rail. The cross-bar 44, which divides the recess into two portions 22A, 22B, causes a subambient pressure to be developed within the recess 22B behind the cross-bar and therefore the flying height is reduced.

Figure 11:
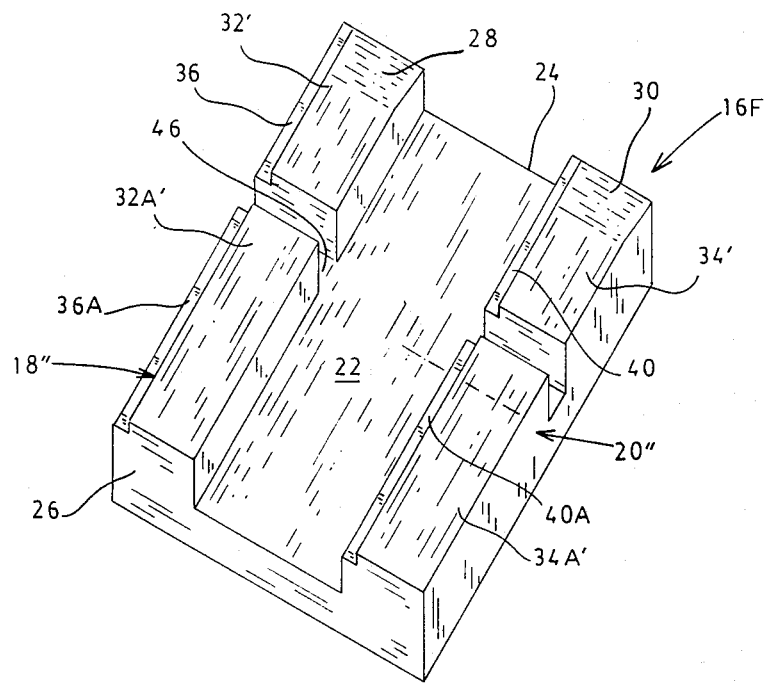
FIG. 11 is an isometric bottom view of another embodiment of the present invention showing a deep transverse recess and a single TPC in corresponding edges of the rails of the slider.

Still another slider is shown at 16F in FIG. 11. In this embodiment there is at least one deep transverse recess 46 in addition to the longitudinal recess 22. This construction permits the use of wider rails thus providing for increased space for housing electronics components. As in the other embodiments, a single TPC per rail can be utilized.

From the foregoing, it will be understood by those versed in the art that, depending upon the operating conditions of a particular slider/disk construction, a slider can be selected having increased resistance to changes in flying height. Further, the slider of the types disclosed herein provide increased damping characteristics such that the slider flying height will quickly stabilize after being subjected to a dynamic input.

Although only specific embodiments of the present invention are shown and described herein, the invention is not to be limited by these embodiments. Rather, the scope of the invention is to be defined by these descriptions taken together with the attached claims and their equivalents.

I claim:

1. A slider assembly for supporting a magnetic transducer in a uniform flying height relationship to a moving magnetic recording medium, which comprises:
   a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;
   at least one rail carried by said support structure, said rail defining a face toward said recording medium, said face being provided with a converging portion at said leading edge for pressurizing air between said face and said recording medium causing said slider assembly to fly at close proximity to said recording medium during moving of said recording medium; and
   wherein said rail is provided with a transverse pressurization contour along only one side edge of said face for proven flying height stability to said slider assembly during operation at a skew angle that is non-zero and damping of variations in flying height caused by dynamic forces applied to said slider assembly, said transverse pressurization contour having an average angle, with respect to said face of said rail of about 0.05 to about 5 degrees.

2. The slider assembly of claim 1 wherein said at least one rail is further provided with a transverse pressurization contour along a second side edge of said face for producing pressurization in one of said contours and expansion in the second of said contours when air flow across said face has a substantially undirectional transverse component when said skew angle is non-zero, at least one of said transverse pressurization contours each having an average angle, $\theta$, with respect to said face of said rail of about 0.05 to less than about 0.5 degrees.

3. The slider assembly of claim 1 wherein said support structure has a pair of rails one along each edge thereof forming a recess therebetween, each of said rails defining a face toward said recording medium, each of said faces of said rails being provided with a converging portion at said leading edge for pressurization of air between said faces and said recording medium whereby said faces fly at a close spacing from said recording medium when said recording medium is moving, each of said rails being provided with said transverse pressurization contour along only one corresponding side edge of faces for providing flying height stability to said slider assembly during operation at a skew angle that is non-zero and damping of variations in flying height caused by dynamic forces applied to said slider assembly, said transverse pressurization contour on each of said rails having an average angle, $\theta$, with respect to said faces of about 0.05 to about 5 degrees.

4. The slider assembly of claim 3 wherein said pair of rails are each further provided with a transverse pressurization, contour along a second side edge of said faces for producing pressurization in one of said contours and expansion in the second of said contours of each rail when air flow occurs across said faces having a substantially unidirectional transverse component when said skew angle is non-zero, at least one of said transverse pressurization contours having an average angle, $\theta$, with respect to said faces of said rails of about 0.05 to less than about 0.5 degrees.

5. The slider assembly of claim 3 wherein said converging portion of each of said faces of said rails at said leading edge is a linear taper having a selected angle with respect to said faces.

6. The slider assembly of claim 5 wherein said selected angle of said converging portion is about 0.5 to about 2 degrees.

7. The slider assembly of claim 3 wherein said one transverse pressurization contour is a step having a height, B, and width, C, to establish said average angle, $\theta$, of about 0.05 to about 5 degrees according to the formula $$\theta = \tan^{-1}(B/C).$$

8. The slider assembly of claim 3 wherein said one transverse pressurization contour is a linear taper forming an angle with said face of about 0.05 to about 5 degrees.

9. The slider assembly of claim 3 wherein said one transverse pressurization contour is a convex surface having a height, B, and width, C, to establish said average angle, $\theta$, of about 0.05 to about 5 degrees according to the formula $$\theta = \tan^{-1}(B/C).$$

10. The slider assembly of claim 4 wherein each of said transverse pressurization contours of each rail is a step having a height, B, and width, C, to establish said average angle, $\theta$, of about 0.05 to less than about 0.5 according to the formula $$\theta = \tan^{-1}(B/C).$$

11. The slider assembly of claim 4 wherein each of said transverse pressurization contours of each rail is a linear taper forming an angle with said faces of less than about 0.05 to about 0.5 degrees.

12. The slider assembly of claim 4 wherein each of said transverse pressurization contours of each rail is a convex surface having a height, B, and width, C, to establish said average angle, $\theta$, of less than about 0.05 to about 0.5 degrees according to the formula $$\theta = \tan^{-1}(B/C).$$

13. The slider assembly of claim 3 further comprising a cross-bar extending between said pair of rails proximate said leading edge, said cross-bar defining a surface toward said recording medium in a plane substantially that of said faces whereby said recess develops a subatmospheric pressure during moving of said recording medium to thereby reduce said flying height of said slider assembly.

14. The slider assembly of claim 3 wherein each of said rails is provided with a transverse recess of a depth substantially equal to said recess between said rails, said transverse recess of each of said rails being aligned with each other, said transverse recesses being intermediate said converging portions and said trailing edge of said support structure.

15. The slider assembly of claim 3 wherein each said transverse pressurization contour occupies from about 10% to about 50% of each of said faces.

16. The slider assembly of claim 3 wherein said transverse pressurization contour of each rail is on an edge toward the center of rotation of said recording medium.

17. The slider assembly of claim 3 wherein said transverse pressurization contour of each rail is on an edge away from the center of rotation of said recording medium.

18. A slider assembly for supporting a magnetic transducer in a uniform flying height relationship to a moving magnetic recording medium, which comprises:
 a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;
 a pair of rails carried by said support structure, one along each edge thereof forming a recess therebetween, said rails each defining a face toward said recording medium, said faces being provided with a converging portion at said leading edge for pressurizing air between said faces and said recording medium causing said slider assembly to fly at close proximity to said recording medium during moving of said recording medium; and
 wherein said rails are each provided with a transverse pressurization contour along only one side edge of said faces for providing flying height stability to said slider assembly during operation at a skew angle that is non-zero and damping of variations in flying height caused by dynamic forces applied to said slider assembly, each said transverse pressurization contour having an average angle, $\theta$, with respect to said faces of said rails of about 0.05 to about 5 degrees.

19. The slider assembly of claim 18 wherein each of said rails is further provided with a transverse pressurization contour along a second side, at least one of said transverse pressurization contours having an average angle, $\theta$, with respect to said faces of said rails of about 0.05 to less than about 0.5 degrees.

20. The slider assembly of claim 18 wherein said transverse pressurization contour is a step having a height, B, and width, C, to establish said average angle, $\theta$, of about 0.05 to about 5 degrees according to the formula $$\theta = \tan^{-1}(B/C).$$

21. The slider assembly of claim 18 wherein said converging portion of said rails at said leading edge is a linear taper having an angle of about 0.5 to about 2 degrees with respect to said faces.

22. The slider assembly of claim 18 further comprising a cross-bar extending between said pair of rails proximate said leading edge, said cross-bar defining a surface toward said recording medium in a plane substantially that of said faces whereby said recess develops a subatmospheric pressure during moving of said recording medium to thereby reduce said flying height of said slider assembly.

23. The slider assembly of claim 18 wherein each of said rails is provided with a transverse recess intermediate said converging portions and said trailing edge of said support structure, said transverse recess of each of said rails being aligned with each other and having a depth substantially equal to said recess between said rails.

24. The slider assembly of claim 18 wherein said transverse pressurization contour is a linear taper forming an angle with said face of about 0.05 to about 5 degrees.

25. The slider assembly of claim 18 wherein said transverse pressurization contour is a convex surface having a height, B, and width, C, to establish said average angle, $\theta$, of about 0.05 to about 5 degrees according to the formula $$\theta = \tan^{-1}(B/C).$$

26. A slider assembly for supporting a magnetic transducer in a uniform flying height relationship to a moving magnetic recording medium, which comprises:
 a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;
 a pair of rails carried by said support structure, along opposite edges thereof forming a recess therebetween, said rails defining faces toward said recording medium, said faces being provided with a linear taper converging portion at said leading edge of about 0.5 to 2 degrees for pressurizing air between said faces and said recording medium causing said slider assembly to fly at close proximity to said recording medium during moving of said recording medium; and
 wherein said rails are each provided with a step-type transverse pressurization contour along only one side edge of said faces for providing flying height stability to said slider assembly during operation at a skew angle that is non-zero and damping of variations in flying height caused by dynamic forces applied to said slider assembly, said step-type transverse pressurization contours having a height, B, and width, C, to establish an average angle, $\theta$, of about 0.05 to about 5 degrees according to the formula $$\theta = \tan^{-1}(B/C).$$

27. The slider assembly of claim 26 wherein said rails are each further provided with a step-type transverse pressurization contour along a second side edge, at least one of said transverse pressurization contours of each said rails having an average angle of about 0.05 to less than about 0.5 degrees.

* * * * *

REEXAMINATION CERTIFICATE (3110th)

United States Patent [19]
White

[11] B1 4,870,519
[45] Certificate Issued Jan. 28, 1997

[54] UNIFORM FLYING HEIGHT SLIDER ASSEMBLY WITH IMPROVED DYNAMIC AIR BEARING CHARACTERISTICS

[76] Inventor: James W. White, 135 Olive Ave., Los Gatos, Calif. 95030

Reexamination Requests:
No. 90/003,639, Nov. 17, 1994
No. 90/003,735, Feb. 21, 1995

Reexamination Certificate for:
Patent No.: 4,870,519
Issued: Sep. 26, 1989
Appl. No.: 123,398
Filed: Nov. 20, 1987

[51] Int. Cl.$^6$ .................................................. G11B 5/60
[52] U.S. Cl. .................................................. 360/103
[58] Field of Search .................................................. 360/103

[56] References Cited

U.S. PATENT DOCUMENTS 3,855,625  12/1974  Garnier .
4,553,184  11/1985  Ogishima .

FOREIGN PATENT DOCUMENTS 57-20963   2/1982  Japan .
57-122063  7/1982  Japan .
59-72679   4/1984  Japan .
60-109073  6/1985  Japan .
61-160885  7/1986  Japan .

OTHER PUBLICATIONS

Fuller, Dudley D., *Theory And Practice Of Lubrication For Engineers*, (1984).
Gross, William A., et al., *Fluid Film Lubrication*, (1980).
James W. White, *Uniform Flying Height Rotary Actuated Air Bearing Slider*, IEEE Transactions On Magnetics, Sep. 1986.
James W. White, An Air Bearing Slider With Uniform Flying Height and Fast Take–Off Characteristics, in 3 Tribology and Mechanics of Magnetic Storage Systems, 95–101 (Bharat Bhushan and Norman S. Eiss, Jr. eds., ASME/ASLE Tribology Conf., Oct. 1986.

*Primary Examiner*—A. J. Heinz

[57] ABSTRACT

A slider assembly for flying a magnetic head at very low clearances on a fluid film over a moving recording medium. This improved slider assembly provides stability and uniformity of flying height and increased damping characteristics when the slider assembly is subjected to dynamic forces. The slider assembly has, in most embodiments, a pair of rails each having a tapered forward end to provide a converging inlet to achieve the fluid film. Most of the static load is carried by the flat surface of the rails rearward from that tapered forward end. Each rail of the slider assembly has at least one longitudinal transverse pressurization contour (TPC) along corresponding edges of the rails to provide this stability of flying height. When only one TPC per rail is used, the particular edge chosen for the TPC depends upon the disk size and skew angle distribution over the recording zone. The TPC's can be of step construction, a linear taper or a convex configuration. For each, the "average" angle as determined by the height and width of the TPC is about 0.05 to about 5 degrees.

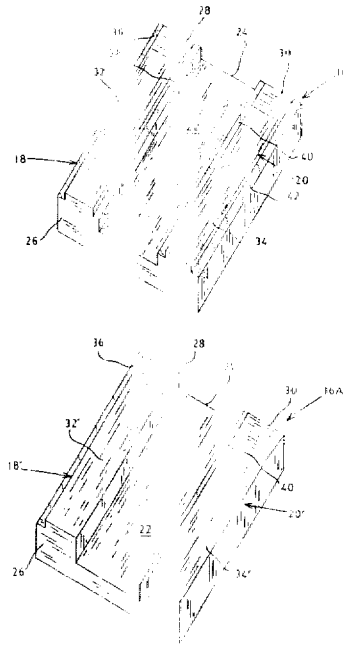

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Figure 14:
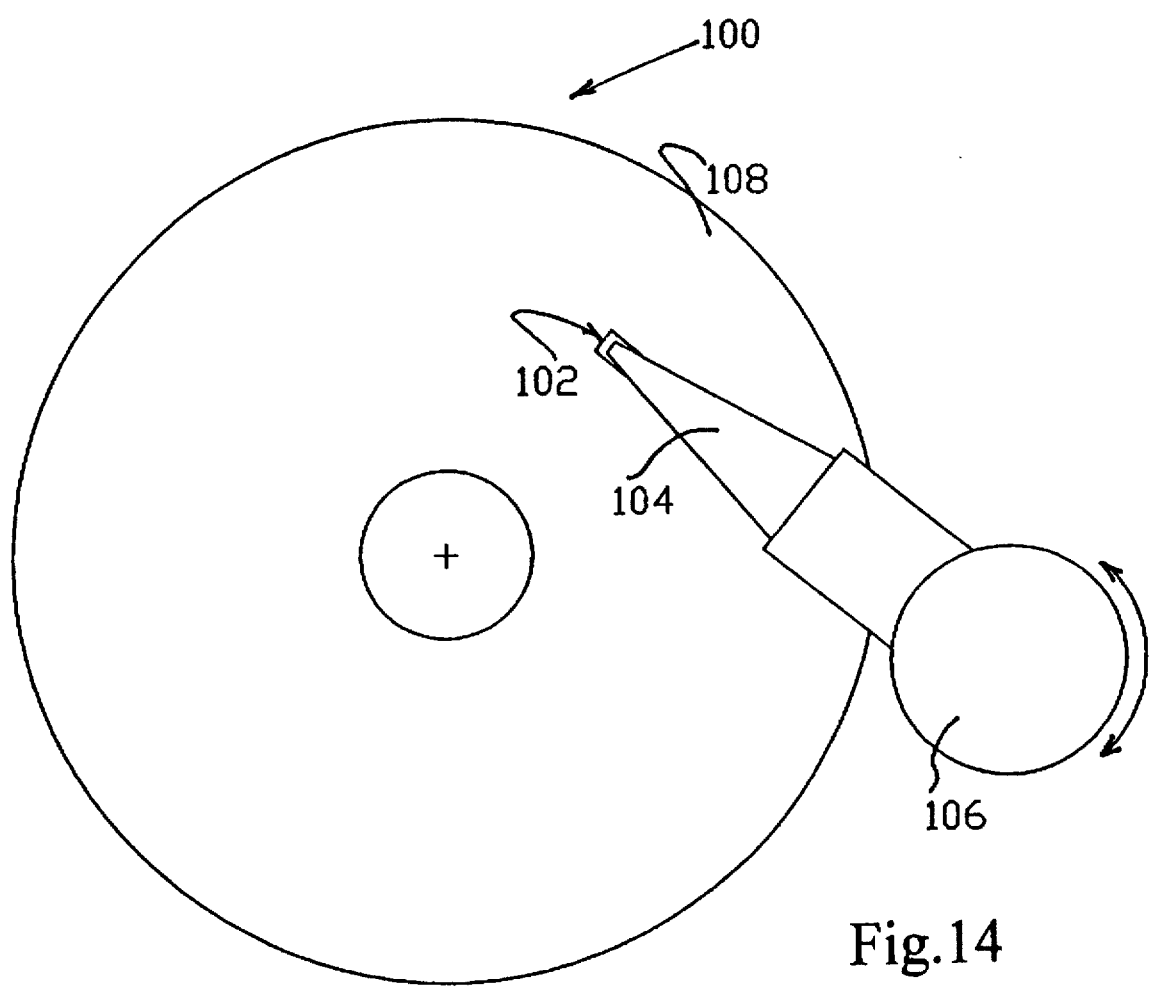

Column 1, between lines 51 and 52:

*A typical magnetic recording system 100 is illustrated schematically in FIG. 14. The system 100 includes a slider 102 attached to an arm 104 which in turn is rotated by a rotary actuator 106. Arm 104 holds slider 102 over a recording medium 108.*

Column 5, between lines 30 and 31:

*FIG. 14 is a schematic view of a magnetic recording system having an actuator and an arm which holds a slider over a recording medium according to the invention.*

Column 8, between lines 61 and 62:

*As illustrated in FIGS. 2 and 3, the transverse pressurization contours extend the full length of the rails. In FIGS. 2 and 3, the width and height of the traverse pressurization contours are constant along the length of the rails except at the converging inlet slopes 28,30 where the height of the transverse pressurization contours differs from the height along the rest of the rails.*

THE DRAWING FIGURES HAVE BEEN CHANGED AS FOLLOWS:

Added new figure to explain invention's relationship to prior art combination.

AS A RESULT OF REEXAMINATION, IT HAS BEEN DETERMINED THAT:

The patentability of claim 26 is confirmed.

Claims 3, 4, 7, 10–12, 20, 24, 25 and 27 are cancelled.

Claims 1, 2, 5, 8, 9, 13–19 are determined to be patentable as amended.

Claims 6, 21–23, dependent on an amended claim, are determined to be patentable.

New claims 28–133 are added and determined to be patentable.

1. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;

[at least one rail] *a pair of rails* carried by said support structure *with one rail along each side thereof and forming a recess therebetween, each of* said [rail] *rails* defining a face toward said recording medium, *each of* said [face] *faces of said rails* being provided with a converging portion at said leading edge for pressurizing air between said [face] *faces* and said recording medium causing said slider assembly to fly at close proximity to said recording medium during moving of said recording medium; [and]

wherein said [rail is] *pair of rails are each* provided with a transverse pressurization contour along only one side edge of said [face] *faces* for [proven] *providing* flying height stability to said slider assembly during operation at a skew angle that is non-zero and damping of variations in flying height caused by dynamic forces applied to said slider assembly[, said transverse pressurization contour having an average angle, with respect to said face of said rail of about 0.05 to about 5 degrees.];

*wherein said pair of rails are each further provided with a transverse pressurization contour along a second side edge of said faces for producing pressurization in one of said contours and expansion in the other of said contours of each rail when air flow occurs across said faces having a substantially unidirectional transverse component when said skew angle is non-zero; and*

*wherein both of said transverse pressurization contours of both rails are steps having a height, B, and width, C, to establish an average angle, θ, of about 0.05 to less than about 0.5 degrees according to the formula*

$$\theta = \tan^{-1}(B/C).$$

2. The slider assembly of claim [1] *46* wherein said [at least one rail is] *pair of rails are* further provided with a transverse pressurization contour along a second side edge of said face for producing pressurization in one of said contours and expansion in the [second] *other* of said contours when air flow across said face has a substantially [undirectional] *unidirectional* transverse component when said skew angle is non-zero, at least one of said transverse pressurization contours each having an average angle, θ, with respect to said face of said rails of about 0.05 to less than [about] 0.5 degrees, *and wherein said average angles of said transverse pressurization contours on said second side edges are different from the average angles of said transverse pressurization contours on the other side edges.*

5. The slider assembly of claim [3] *1* wherein said converging portion of each of said faces of said rails at said leading edge is a linear taper having a selected angle with respect to said faces.

8. The slider assembly of claim [3] *58* wherein *one of* said [one] transverse pressurization [contour] *contours* is a linear taper forming an angle with said face of about 0.05 to about 5 degrees.

9. The slider assembly of claim [3] *58* wherein *one of* said [one] transverse pressurization [contour] *contours* is a convex surface having a height, B, and width, C, to establish said average angle, θ, of about 0.05 to about 5 degrees according to the formula $\theta = \tan^{-1}(B/C)$.

13. The slider assembly of claim [3] *1* further comprising a cross-bar extending between said pair of rails proximate said leading edge, said cross-bar defining a surface toward said recording medium in a plane substantially that of said faces whereby said recess develops a subatmospheric pressure during moving of said recording medium to thereby reduce said flying height of said slider assembly.

14. The slider assembly of claim [3] *1* wherein each of said rails is provided with a transverse recess of a depth substantially equal to said recess between said rails, said transverse recess of each of said rails being aligned with each other, said transverse recesses being intermediate said converging portions and said trailing edge of said support structure.

15. The slider assembly of claim [3] *1* wherein each said transverse pressurization contour occupies from about 10% to about 50% of each of said faces.

16. The slider assembly of claim [3] *26 wherein said recording medium rotates about a center, and* wherein said transverse pressurization contour of each rail is on an edge toward the center of rotation of said recording medium.

17. The slider assembly of claim [3] *26 wherein said recording medium rotates about a center, and* wherein said transverse pressurization contour of each rail is on an edge away from the center of rotation of said recording medium.

18. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure, a pair of rails carried by said support structure, one along each edge thereof forming a recess therebetween, said rails each defining a face toward said recording medium, said faces being provided with a converging portion at said leading edge for pressurizing air between said faces and said recording medium causing said slider assembly to fly at close proximity to said recording medium during moving of said recording medium; and wherein said rails are each provided with a transverse pressurization contour along only one side edge of said faces for providing flying height stability to said slider assembly during operation at a skew angle that is non-zero and damping of variations in flying height caused by dynamic forces applied to said slider assembly, each said transverse pressurization contour having an average angle, θ, with respect to said faces of said rails of about 0.05 to about 5 degrees.;

*wherein said transverse pressurization contour is a step having a height, B, and width, C, to establish said average angle, θ, of about 0.05 to about 5 degrees according to the formula*

$\theta = \tan^{-1}(B/C)$.

19. The slider assembly of claim 18 wherein each of said rails is further provided with a transverse pressurization contour along a second side *edge*, at least one of said transverse pressurization contours having an average angle, θ, with respect to said faces of said rails of about 0.05 to less than [about] 0.5 degrees, *and wherein said average angles of said transverse pressurization contours on said second side edges are different from the average angles of said transverse pressurization contours on the other side edges.*

28. *The slider assembly of claim 1, wherein said transverse pressurization contours extend along the entire length of said rails.*

29. *The slider assembly of claim 1, wherein said transverse pressurization contours are substantially uniform in width along at least a portion of said rail.*

30. *The slider assembly of claim 1, wherein said transverse pressurization contours are substantially uniform in height along at least a portion of said rail.*

31. *The slider assembly of claim 1, wherein the height of at least one of said transverse pressurization contours is constant along the length of the rail except at said converging portion where the height varies.*

32. *The slider assembly of claim 1, wherein said support sturcture is included in a magnetic recording system having an actuator and an arm, wherein said support structure may be positioned over said recording medium by movement of said arm by said actuator.*

33. *The slider assembly of claim 32, wherein said actuator is a rotary actuator.*

34. *The slider assembly of claim 18, wherein said transverse pressurization contours extend along the entire length of said rails.*

35. *The slider assembly of claim 18, wherein said transverse pressurization contours are substantially uniform in width along at least a portion of said rail.*

36. *The slider assembly of claim 18, wherein said transverse pressurization contours are substantially uniform in height along at least a portion of said rail.*

37. *The slider assembly of claim 18, wherein the height of at least one of said transverse pressurization contours is constant along the length of the rail except at said converging portion where the height varies.*

38. *The slider assembly of claim 18, wherein said support structure is included in a magnetic recording system having an actuator and an arm, wherein said support structure may be positioned over said recording medium by movement of said arm by said actuator.*

39. *The slider assembly of claim 38, wherein said actuator is a rotary actuator.*

40. *The slider assembly of claim 26, wherein said transverse pressurization contours extend along the entire length of said rails.*

41. *The slider assembly of claim 26, wherein said transverse pressurization contours are substantially uniform in width along at least a portion of said rail.*

42. *The slider assembly of claim 26, wherein said transverse pressurization contours are substantially uniform in height along at least a portion of said rail.*

43. *The slider assembly of claim 26, wherein the height of at least one of said transverse pressurization contours is constant along the length of the rail except at said converging portion where the height varies.*

44. *The slider assembly of claim 26, wherein said support structure is included in a magnetic recording system having an actuator and an arm, wherein said support structure may be positioned over said recording medium by movement of said arm by said actuator.*

45. *The slider assembly of claim 44, wherein said actuator is a rotary actuator.*

46. *A slider assembly for supporting a magnetic transducer in a uniform flying height relationship to a moving magnetic recording medium, which comprises:* a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;

a pair of rails carried by said support structure with one rail along each edge thereof and forming a recess therebetween, each of said rails defining a face toward said recording medium, each of said faces being provided with a converging portion at said leading edge for pressurizing air between said faces and said recording medium causing said slider assembly to fly at close proximity to said recording medium during moving of said recording medium;

wherein each of said rails is provided with a transverse pressurization contour along only one corresponding side edge of said faces for providing flying height stability to said slider assembly during operation at a skew angle that is non-zero and damping of variations in flying height caused by dynamic forces applied to said slider assembly; and wherein said one transverse pressurization contour on each of said rails is a step having a height, B, and width, C, to establish an average angle, θ, of about 0.05 to about 5 degrees according to the formula $$\theta = \tan^{-1}(B/C).$$

47. The slider assembly of claim 46 further comprising a cross-bar extending between said pair of rails proximate said leading edge, whereby said recess develops a subatmospheric pressure during moving of said recording medium to thereby reduce said flying height of said slider assembly.

48. The slider assembly of claim 46 wherein each of said rails is provided with a transverse recess of a depth substantially equal to said recess between said rails, said transverse recess of each of said rails being aligned with each other, said transverse recesses being intermediate said converging portions and said trailing edge of said support structure.

49. The slider assembly of claim 46 wherein each said transverse pressurization contour occupies from about 10% to about 50% of each of said faces.

50. The slider assembly of claim 46 wherein said recording medium rotates about a center, and wherein said transverse pressurization contour of each rail is on an edge toward the center of rotation of said recording medium.

51. The slider assembly of claim 46 wherein said recording medium rotates about a center, and wherein said transverse pressurization contour of each rail is on an edge away from the center of rotation of said recording medium.

52. The slider assembly of claim 46, wherein said transverse pressurization contours extend along the entire length of said rails.

53. The slider assembly of claim 46, wherein said transverse pressurization contours are substantially uniform in width along at least a portion of said rail.

54. The slider assembly of claim 46, wherein said transverse pressurization contours are substantially uniform in height along at least a portion of said rail.

55. The slider assembly of claim 46, wherein the height of at least one of said transverse pressurization contours is constant along the length of the rail except at said converging portion where the height varies.

56. The slider assembly of claim 46, wherein said support structure is included in a magnetic recording system having an actuator and an arm, wherein said support structure may be positioned over said recording medium by movement of said arm by said actuator.

57. The slider assembly of claim 56, wherein said actuator is a rotary actuator.

58. A slider assembly for supporting a magnetic transducer in a uniform flying height relationship to a moving magnetic recording medium, which comprises:

a supporting structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;

a pair of rails carried by said support structure with one rail along each edge thereof and forming a recess therebetween, each of said rails defining a face toward said recording medium, each of said faces being provided with a converging portion at said leading edge for pressurizing air between said faces and said recording medium causing said slider assembly to fly at close proximity to said recording medium during moving of said recording medium;

wherein each of said rails is provided with a transverse pressurization contour along only one corresponding side edge of said face for providing flying height stability to said slider assembly during operation at a skew angle that is non-zero and damping of variations in flying height caused by dynamic forces applied to said slider assembly, said transverse pressurization contour on each of said rails having an average angle, with respect to said faces of said rails of about 0.05 to about 5 degrees; and wherein each said transverse pressurization contour occupies from about 10% to 50% of each of said faces.

59. The slider assembly of claim 58, wherein said transverse pressurization contour of each rail is stepped in geometry.

60. The slider assembly of claim 58, wherein said transverse pressurization contours extend along the entire length of said rails.

61. The slider assembly of claim 58, wherein said transverse pressurization contours are substantially uniform in width along at least a portion of said rail.

62. The slider assembly of claim 58, wherein said transverse pressurization contours are substantially uniform in height along at least a portion of said rail.

63. The slider assembly of claim 58, wherein the height of at least one of said transverse pressurization contours is constant along the length of the rail except at said converging portion where the height varies.

64. The slider assembly of claim 58, wherein said support structure is included in a magnetic recording system having an actuator and an arm, wherein said support structure may be positioned over said recording medium by movement of said arm by said actuator.

65. The slider assembly of claim 64, wherein said actuator is a rotary actuator.

66. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;

a pair of rails carried by said support structure, along opposite edges thereof forming a recess therebetween, said rails defining faces toward said recording medium, said faces being provided with a linear taper converging portion at said leading edge of about 0.5 to 2 degrees for pressurizing air between said faces and said recording medium causing said slider assembly to fly at close proximity to said recording medium during moving of said recording medium;

wherein said rails are each provided with a step-type transverse pressurization contour along one side edge of said faces for providing flying height stability to said slider assembly during operation at a skew angle that is non-zero and damping of variations in flying height caused by dynamic forces applied to said slider assembly, said step-type transverse pressurization contours having a height, B, and width, C, to establish an average value, θ, of about 0.05 to about 5 degrees according to the formula $\theta = \tan^{-1}(B/C)$; and wherein said rails are each further provided with a step-type transverse pressurization contour along a second side edge, at least one of said transverse pressurization contours of each of said rails having an average angle of about 0.05 to less than 0.5 degrees, and wherein said average angles of said transverse pressurization contours on said second side edges are different from the average angles of said transverse pressurization contours on the other side edges.

67. The slider assembly of claim 66, wherein said transverse pressurization contours extend along the entire length of said rails.

68. The slider assembly of claim 66, wherein said transverse pressurization contours are substantially uniform in width along at least a portion of said rail.

69. The slider assembly of claim 66, wherein said transverse pressurization contours are substantially uniform in height along at least a portion of said rail.

70. The slider assembly of claim 66, wherein the height of at least one of said transverse pressurization contours is constant along the length of the rail except at said converging portion where the height varies.

71. The slider assembly of claim 66, wherein said support structure is included in a magnetic recording system having an actuator and an arm, wherein said support structure may be positioned over said recording medium by movement of said arm by said actuator.

72. The slider assembly of claim 71, wherein said actuator is a rotary actuator.

73. The slider assembly of claim 66, further comprising a cross-bar extending between said pair of rails proximate said leading edge, whereby said recess develops a subatmospheric pressure during moving of said recording medium to thereby reduce said flying height of said slider assembly.

74. A slider assembly for supporting a magnetic tranducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;

a pair of rails carried by said support structure with one rail along each edge thereof and forming a recess therebetween, each of said rails defining a face toward said recording medium, each of said faces being provided with a converging portion at said leading edge for pressurizing air between said faces and said recording medium causing said slider assembly to fly at close proximity to said recording medium during moving of said recording medium;

wherein each of said rails is provided with a transverse pressurization contour along only one side edge of said face for providing flying height stability to said slider assembly during operation at a skew angle that is non-zero and damping of variations in flying height caused by dynamic forces applied to said slider assembly; and wherein said one transverse pressurization contour on each of said rails is a convex surface having a height, B, and width, C, to establish an average angle, θ, of about 0.05 to about 5 degrees according to the formula $$\theta = \tan^{-1}(B/C).$$

75. The slider assembly of claim 74, wherein said transverse pressurization contours extend along the entire length of said rails.

76. The slider assembly of claim 74, wherein said transverse pressurization contours are substantially uniform in width along at least a portion of said rail, and wherein said transverse pressurization contours are substantially uniform in height along at least a portion of said rail.

77. The slider assembly of claim 74, wherein the height of at least one of said transverse pressurization contours is constant along the length of the rail except at said converging portion where the height varies.

78. The slider assembly of claim 74, wherein said support structure is included in a magnetic recording system having an actuator and an arm, wherein said support structure may be positioned over said recording medium by movement of said arm by said actuator.

79. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive negative values with respect to the direction of motion of said recording medium at said support structure, a pair of rails carried by said support structure, one along each edge thereof forming a recess therebetween, said rails each defining a face toward said recording medium, said faces being provided with a converging portion at said leading edge for pressurizing air between said faces and said recording medium causing said slider assembly to fly at close proximity to said recording medium during moving of said recording medium; and wherein said rails are each provided with a transverse pressurization contour along only one side edge of said faces for providing flying height stability to said slider assembly during operation at a skew angle that is non-zero and damping of variations in flying height caused by dynamic forces applied to said slider assembly;

wherein said transverse pressurization contour is a convex surface having a height, B, and width, C, to establish an average angle, θ, of about 0.05 to about 5 degrees according to the formula $$\theta = \tan^{-1}(B/C).$$

80. The slider assembly of claim 79, wherein said transverse pressurization contours extend along the entire length of said rails.

81. The slider assembly of claim 79, wherein said transverse pressurization contours are substantially uniform in width along at least a portion of said rail.

82. The slider assembly of claim 79, wherein said transverse pressurization contours are substantially uniform in height along at least a portion of said rail.

83. The slider assembly of claim 79, wherein the height of at least one of said transverse pressurization contours is constant along the length of the rail except at said converging portion where the height varies.

84. The slider assembly of claim 79, wherein said support structure is included in a magnetic recording system having an actuator and an arm, wherein said support structure may be positioned over said recording medium by movement of said arm by said actuator.

85. The slider assembly of claim 84, wherein said actuator is a rotary actuator.

86. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;

a pair of rails carried by said support structure with one rail along each edge thereof and forming a recess therebetween, each of said rails defining a face toward said recording medium, each of said faces being provided with a converging portion at said leading edge for pressurizing air between said faces and said recording medium casing said slider assembly to fly at close proximity to said recording medium during moving of said recording medium;

wherein each of said rails is provided with a transverse pressurization contour along only one corresponding side edge of said face for providing flying height stability to said slider assembly during operation at a skew angle that is non-zero and damping of variations in flying height caused by dynamic forces applied to said slider assembly, said transverse pressurization contour on each of said rails having an average angle, with respect to said faces of said rails of about 0.05 to about 5 degrees; and wherein said recording medium rotates about a center, and wherein said transverse pressurization contour of each rail is on an edge toward the center of rotation of said recording medium.

87. The slider assembly of claim 86, wherein said transverse pressurization contours extend along the entire length of said rails.

88. The slider assembly of claim 86, wherein said transverse pressurization contours are substantially uniform in width along at least a portion of said rail.

89. The slider assembly of claim 86, wherein said transverse pressurization contours are substantially uniform in height along at leaast a portion of said rail.

90. The slider assembly of claim 86, wherein the height of at least one of said transverse pressurization contours is constant along the length of the rail except at said converging portion where the height varies.

91. The slide assembly of claim 86, wherein said support structure is included in a magnetic recording system having an actuator and an arm, wherein said support structure may be positioned over said recording medium by movement of said arm by said actuator.

92. The slider assembly of claim 91, wherein said actuator is a rotary actuator.

93. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle angle ranging from zero to positive and negative values with respect to the direction of motion of said recording medium at said support structure;

at least one rail carried by said support structure, said rail defining a face toward said recording medium, said face being provided with a converging portion at said leading edge for pressurizing air between said face and said recording medium causing said slider assembly to fly at close proximity to said recording medium during moving of said recording medium; and wherein said rail is provided with a stepped transverse pressurization contour along a first side edge of said face for providing flying height stability to said slider assembly during operation at a skew angle that is non-zero and damping of variations in flying height caused by dynamic forces applied to said slider assembly, said transverse pressurization contour having an average angle, with respect to said face of said rail of about 0.05 to about 5 degrees;

wherein said at least one rail is further provided with a stepped transverse pressurization contour along a second side edge of said face for producing pressurization in one of said contours and expansion in the second of said contours when air flow across said face has a substantially unidirectional transverse component when said skew angle is non-zero, said transverse pressurization contour along said second side edge having an average angle, θ, with respect to said face of said rail of about 0.05 to less than 0.5 degrees, and wherein said average angle of said transverse pressurization contour on said second side edge is different from the average angle of said transverse pressurization contour on said first side edge.

94. The slider assembly of claim 93 wherein said support structure is provided with a second rail to form a recess between said rails, wherein said rails are provided with a transverse recess of a depth substantially equal to said recess between said rails, said transverse recess of each of said rails being aligned with each other, said transverse recesses being intermediate said converging portions and said trailing edge of said support structure.

95. The slider assembly of claim 93 wherein each said transverse pressurization contour occupies from about 10% to about 50% of each of said faces.

96. The slider assembly of claim 93, wherein said transverse pressurization contours extend along the entire length of said rails.

97. The slider assembly of claim 93, wherein said transverse pressurization contours are substantially uniform in width along at least a portion of said rail.

98. The slider assembly of claim 93, wherein said transverse pressurization contours are substantially uniform in height along at least a poriton of said rail.

99. The slider assembly of claim 93, wherein the height of at least one of said transverse pressurization contours is constant along the length of the rail except at said converging portion where the height varies.

100. The slider assembly of claim 99, wherein said support structure is included in a magnetic recording system having an actuator and an arm, wherein said support structure may be positioned over said recording medium by movement of said arm by said actuator.

101. The slider assembly of claim 100, wherein said actuator is a rotary actuator.

102. A slider assembly for supporting a magnetic transducer in a uniform flying height relationship to a moving magnetic recording medium, which comprises:

a support structure having leaading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure, a pair of rails carried by said support structure, one along each edge thereof forming a recess therebetween, said rails each defining a face toward said recording medium, said faces being provided with a converging portion at said leading edge for pressurizing air between said faces and said recording medium causing said slider assembly to fly at close proximity to said recording medium during moving of said recording medium;

a cross-bar extending between said pair of rails proximate said lead edge, whereby said recess develops a subatmospheric pressure during moving of said recording medium to thereby reduce said flying height of said slider assembly;

wherein said rails are each provided with a stepped transverse pressurization contour along a first side edge of said faces for providing flying height stability to said slider assembly during operation at a skew angle that is non-zero and damping of variations in flying height caused by dynamic forces applied to said slider assembly, each said transverse pressurization contour on said first side edge having an average angle, θ, with respect to said faces of said rails of about 0.05 to about 5 degrees; and wherein each of said rails is further provided with a stepped transverse pressurization contour along a second side edge, at least one of said transverse pressurization contours having an average angle, θ, with respect to said faces of said rails of about 0.05 to less than 0.5 degrees, and wherein said average angles of said transverse pressurization contours on said second side edges are different form the average angles of said transverse pressurization contours on said first side edges.

103. The slider assembly of claim 102 wherein each said transverse pressurization contour occupies from about 10% to about 50% of each of said faces.

104. The slider assembly of claim 102, wherein said transverse pressurization contours extend along the entire length of said rails.

105. The slider assembly of claim 102, wherein said transverse pressurization contours are substantially uniform in width along at least a portion of said rail.

106. The slider assembly of claim 102, wherein said transverse pressurization contours are substantially uniform in height along at least a portion of said rail.

107. The slider assembly of claim 102, wherein the height of at least one of said transverse pressurization contours is constant along the length of the rail except at said converging portion where the height varies.

108. The slider assembly of claim 102, wherein said support structure is included in a magnetic recording system having an actuator and an arm, wherein said support structure may be positioned over said recording medium by movement of said arm by said actuator.

109. The slider assembly of claim 108, wherein said actuator is a rotary actuator.

110. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;

at least one rail carried by said support strucutre, said rail defining a face toward said recording medium, said face being provided with a converging portion at said leading edge for pressurizing air between said face and said recording medium causing said slider assembly to fly at close proximity to said recording medium during moving of said recording medium;

wherein said rail is provided with a transverse pressurization contour along only one side edge of said face for providing flying height stability to said slider assembly during operation at a skew angle that is non-zero and damping of variations in flying height caused by dynamic forces applied to said slider assembly, said transverse pressurization contour having an average angle, with respect to said face of said rail of about 0.05 to about 5 degrees; and wherein said at least one rail is further provided with a transverse pressurization contour along a second side edge of said face for producing pressurization in one of said contours and expansion in the second of said contours when air flow across said face has a substantially unidirectional transverse component when said skew angle is non-zero, at least one of said transverse pressurization contours each having an average angle, θ, with respect to said face of said rail of about 0.05 to less than 0.5 degrees, and wherein said average angles of said transverse pressurization contours on said rail are different from each other.

111. The slider assembly of claim 110, wherein said transverse pressurization contours extend along the entire length of said rails.

112. The slider assembly of claim 110, wherein said transverse pressurization contours are substantially uniform in width along at least a portion of said rail.

113. The slider assembly of claim 110, wherein said transverse pressurization contours are substantially uniform in height along at least a portion of said rail.

114. The slider assembly of claim 110, wherein the height of at least one of said transverse pressurization contours is constant along the length of the rail except at said converging portion where the height varies.

115. The slider assembly of claim 110, wherein said support structure is included in a magnetic recording system having an actuator and an arm, wherein said support structure may be positioned over said recording medium by movement of said arm by said actuator.

116. The slider assembly of claim 115, wherein said actuator is a rotary actuator.

117. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure, a pair of rails carried by said support structure, one along each edge thereof forming a recess therebetween, said rails each defining a face toward said recording medium, said faces being provided with a converging portion at said leading edge for pressurizing air between said faces and said recording medium causing said slider assembly to fly at close proximity to said recording medium during moving of said recording medium;

wherein said rails are each provided with a transverse pressurization contour along only one side edge of said faces for providing flying height stability to said slider assembly during operation at a skew angle that is non-zero and damping of variations in flying height caused by dynamic forces applied to said slider assembly, each said transverse pressurization contour having an average angle, θ, with respect to said faces of said rails of about 0.05 to about 5 degrees; and wherein each of said rails is further provided with a transverse pressurization contour along a second side edge, at least one of said transverse pressurization contours having an average angle, θ, with respect to said faces of said rails of about 0.05 to less than 0.5 degrees, and wherein said average angles of said transverse pressurization contours on each rail are different from each other.

118. The slider assembly of claim 117, wherein said transverse pressurization contours extend along the entire length of said rails.

119. The slider assembly of claim 117, wherein said transverse pressurization contours are substantially uniform in width along at least a portion of said rail.

120. The slider assembly of claim 117, wherein said transverse pressurization contours are substantially uniform in height along at least a portion of said rail.

121. The slider assembly of claim 117, wherein the height of at least one of said transverse pressurization contours is constant along the length of the rail except at said converging portion where the height varies.

122. The slider assembly of claim 117, wherein said support structure is included in a magnetic recording system having an actuator and an arm, wherein said support structure may be positioned over said recording medium by movement of said arm by said actuator.

123. The slider assembly of claim 122, wherein said actuator is a rotary actuator.

124. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure, a pair of rails carried by said support structure, one along each edge thereof forming a recess therebetween, said rails each defining a face toward said recording medium, said faces being provided with a converging portion at said leading edge for pressurizing air between said faces and said recording medium causing said slider assembly to fly at close proximity to said recording medium during moving of said recording medium;

wherein said rails are each provided with a stepped-type transverse pressurization contour along only one side edge of said faces for providing flying height stability to said slider assembly during operation at a skew angle that is non-zero and damping of variations in flying height caused by dynamic forces applied to said slider assembly, each said transverse pressurization contour having an average angle, θ, with respect to said faces of said rails of about 0.05 to about 5 degrees; and wherein said support structure is included in a magnetic recording system having an actuator and an arm, wherein said support structure may be positioned over said recording medium by movement of said arm by said actuator.

125. The slider assembly of claim 124, wherein said transverse pressurization contours extend along the entire length of said rails.

126. The slider assembly of claim 124, wherein said transverse pressurization contours are substantially uniform in width along at least a portion of said rail.

127. The slider assembly of claim 124, wherein said transverse pressurization contours are substantially uniform in height along at least a portion of said rail.

128. The slider assembly of claim 124, wherein the height of at least one of said transverse pressurization contours is constant along the length of the rail except at said converging portion where the height varies.

129. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure, a pair of rails carried by said support structure with one rail along each side thereof and forming a recess therebetween, each of said rails defining a face toward said recording medium, each of said faces of said rails being provided with a converging portion at said leading edge for pressurizing air between said faces and said recording medium causing said slider assembly to fly at close proximity to said recording medium during moving of said recording medium;

wherein said pair of rails are each provided with a transverse pressurization contour along a first side edge of said faces for providing flying height stability to said slider assembly during operation at a skew angle that is non-zero and damping of variations in flying height caused by dynamic forces applied to said slider assembly;

wherein said pair of rails are each further provided with a transverse pressurization contour along a second side edge of said faces for producing pressurization in one of said contours and expansion in the second of said contours of each rail when air flow occurs across said faces having a substantially unidirectional transverse component when said skew angle is non-zero; and wherein each of said transverse pressurization contours of each rail is a step having a height B, and width, C, to establish an average angle, θ, of about 0.05 to less than 0.5 degrees according to the formula $θ=\tan^{-1}(B/C)$, and wherein said average angles of said transverse pressurization contours on said second side edges are different from the average angles of said transverse pressurization contours on said first side edges.

130. A slider assembly as in any of claims 1, 18, 26, 46, 58, 66, 74, 79, 86, 93, 102, 110, 117, 124, 129, wherein said support structure is operably attached to a support arm, said support structure and said support arm being included in a magnetic read/write system.

131. A slider assembly as in any of claims 18, 26, 46, 58, 74, 79, 86, 124, wherein the moving magnetic recording medium comprises a 3.5 inch type disk.

132. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;

a pair of rails carried by said support structure, said rails defining a face toward said recording medium, said faces being provided with a converging portion at said leading edge for pressurizing air between said faces and said recording medium causing said slider assembly to fly at close proximity to said recording medium during moving of said recording medium;

wherein said rails are provided with a transverse pressurization contour along a first side edge of said faces for providing flying height stability to said slider assembly during operation at a skew angle that is non-zero and damping of variations in flying height caused by dynamic forces applied to said slider assembly, each said transverse pressurization contour having an average angle, with respect to said face of said rail of about 0.05 to about 5 degrees; and wherein said pair of rails are further provided with a transverse pressurization contour along a second side edge of said faces, each said transverse pressurization contour along said second side edge having an average angle with respect to said face of said rail that is different from said transverse pressurization contour on said first side edge, wherein each said transverse pressurization contour along said second side edge has an average angle with respect to said face that is between one-half to one-fourth of the average angle for each said transverse pressurization contour on said first side edge and is in the range from 0.05 to less than 0.8 degrees, and wherein said second side edge is toward a center of rotation of said recording medium.

133. A slider assembly for supporting a magnetic transducer in a uniform flying height relationship to a moving magnetic recording medium, which comprises:

a support structure having leading and trailing edges relative to the motion of said recording medium, and a longitudinal axis disposed along the length of said support structure, said longitudinal axis being at a skew angle ranging from zero to positive and negative values with respect to the direction of motion of said recording medium at said support structure;

a pair of rails carried by said support structure, said rails defining a face toward said recording medium, said faces being provided with a converging portion at said leading edge for pressurizing air between said faces and said recording medium causing said slider assembly to fly at close proximity to said recording medium during moving of said recording medium;

wherein said rails are provided with a stepped-type transverse pressurization contour along a first side edge of said faces for providing flying height stability to said slider assembly during operation at a skew angle that is non-zero and damping of variations in flying height caused by dynamic forces applied to said slider assembly, each said transverse pressurization contour having an average angle, with respect to said face of said rail of about 0.05 to about 5 degrees; and wherein said pair of rails are further provided with a stepped-typed transverse pressurization contour along a second side edge of said faces, each said transverse pressurization contour along said second side edge having an average angle with respect to said face of said rail that is different from said transverse pressurization contour on said first side edge, wherein each said transverse pressurization contour along said second side edge has an average angle with respect to said face that is between one-half to one-fourth of the average angle for each said transverse pressurization contour on said first side edge and is in the range from 0.05 to less than 0.5 degrees, and wherein said second side edge is toward a center of rotation of said recording medium.

* * * * *

(12) EX PARTE REEXAMINATION CERTIFICATE (6619th)
United States Patent
White

(10) Number: US 4,870,519 C2
(45) Certificate Issued: Jan. 13, 2009

(54) UNIFORM FLYING HEIGHT SLIDER ASSEMBLY WITH IMPROVED DYNAMIC AIR BEARING CHARACTERISTICS

(76) Inventor: James W. White, 135 Olive Ave., Los Gatos, CA (US) 95030

Reexamination Request:
No. 90/007,417, Feb. 11, 2005

Reexamination Certificate for:
Patent No.: 4,870,519
Issued: Sep. 26, 1989
Appl. No.: 07/123,398
Filed: Nov. 20, 1987

Reexamination Certificate B1 4,870,519 issued Jan. 28, 1997

(51) Int. Cl.
*G11B 5/60* (2006.01)

(52) U.S. Cl. .................................. 360/236.7
(58) Field of Classification Search ............. None
See application file for complete search history.

(56) References Cited

U.S. PATENT DOCUMENTS

| | | | |
|---|---|---|---|
| 4,212,044 A | 7/1980 | Plotto | 360/103 |
| 4,214,287 A | 7/1980 | Stromsta et al. | 360/103 |
| 4,225,891 A | 9/1980 | Plotto | 360/103 |
| 4,535,374 A * | 8/1985 | Anderson et al. | 360/255.9 |
| 4,564,585 A | 1/1986 | Blaske et al. | 430/313 |
| 4,769,727 A | 9/1988 | Mao | 360/103 |
| 4,802,042 A | 1/1989 | Strom | 360/103 |
| 5,062,017 A | 10/1991 | Strom et al. | 360/103 |
| 5,128,822 A | 7/1992 | Chapin et al. | 360/103 |
| 5,136,445 A | 8/1992 | Zak | 360/103 |

(Continued)

FOREIGN PATENT DOCUMENTS

| | | |
|---|---|---|
| EP | 0129336 | 12/1984 |
| EP | 0110212 | 11/1985 |
| EP | 0 780 836 A1 | 6/1997 |
| JP | 51-114111 | 10/1976 |
| JP | 53-37406 | 4/1978 |
| JP | 53-39111 | 4/1978 |
| JP | 53-61319 | 6/1978 |
| JP | 54001011 | 1/1979 |
| JP | 54-66818 | 5/1979 |
| JP | 54-81819 | 6/1979 |

(Continued)

OTHER PUBLICATIONS

Harker, J. M., et al., A Quarter Century of Disk File Innovation, IBM Journal of Research and Development vol. 25 No. 5 at 677–670 (Sep. 1981) (14 pages).

Archibald, et al., *The Rayleigh Step Bearing Applied to a Gas-Lubricated Journal of Finite Length*, Transactions of the ASME, vol. 89 (Jan. 1967), pp. 38–46.

(Continued)

*Primary Examiner*—Joseph R Pokrzywa

(57) ABSTRACT

A slider assembly for flying a magnetic head at very low clearances on a fluid film over a moving recording medium. This improved slider assembly provides stability and uniformity of flying height and increased damping characteristics when the slider assembly is subjected to dynamic forces. The slider assembly has, in most embodiments, a pair of rails each having a tapered forward end to provide a converging inlet to achieve the fluid film. Most of the static load is carried by the flat surface of the rails rearward from that tapered forward end. Each rail of the slider assembly has at least one longitudinal transverse pressurization contour (TPC) along corresponding edges of the rails to provide this stability of flying height. When only one TPC per rail is used, the particular edge chosen for the TPC depends upon the disk size and skew angle distribution over the recording zone. The TPC's can be of step construction, a linear taper or a convex configuration. For each, the "average" angle as determined by the height and width of the TPC is about 0.05 to about 5 degrees.

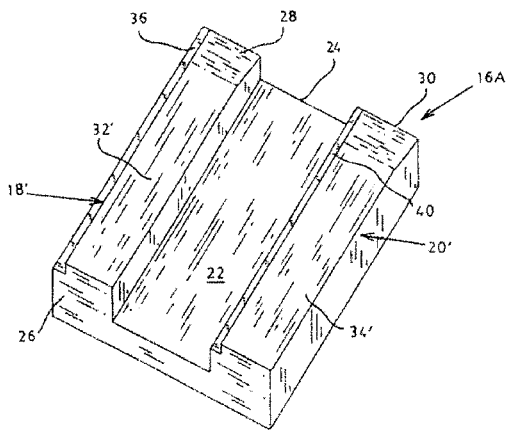

U.S. PATENT DOCUMENTS

| | | | |
|---|---|---|---|
| 5,157,567 A | 10/1992 | Zak et al. | 360/103 |
| 5,196,973 A | 3/1993 | Chapin et al. | 360/103 |
| 5,200,868 A | 4/1993 | Chapin et al. | 360/103 |
| 5,210,666 A | 5/1993 | Chapin et al. | 360/103 |
| 5,218,494 A | 6/1993 | Chapin et al. | 360/103 |
| 5,218,495 A | 6/1993 | Chapin et al. | 360/103 |
| 5,267,109 A | 11/1993 | Chapin et al. | 360/103 |
| 5,274,518 A | 12/1993 | Chapin et al. | 360/103 |
| 5,317,465 A | 5/1994 | Chapin et al. | 360/103 |
| 5,343,343 A | 8/1994 | Chapin | 360/103 |
| 5,404,256 A | 4/1995 | White | 360/103 |
| 5,479,310 A | 12/1995 | Atsushi et al. | 360/126 |
| 5,566,075 A | 10/1996 | Shouji et al. | 364/468.24 |
| 4,673,996 A | 2/1997 | White | |
| 5,668,686 A | 9/1997 | Shouji et al. | 360/113 |
| 5,799,388 A | 9/1998 | Shouji | 29/603.09 |
| 5,903,460 A | 5/1999 | Shouji et al. | 364/468.24 |
| 5,903,968 A | 5/1999 | Shouji | 29/306.09 |
| 5,907,459 A | 5/1999 | Shouji et al. | 360/113 |
| 5,943,763 A | 8/1999 | Shouji et al. | 29/603.14 |
| 5,978,187 A | 11/1999 | Shouji et al. | 360/126 |
| 6,010,753 A | 1/2000 | Shouji et al. | 427/534 |

FOREIGN PATENT DOCUMENTS

| | | |
|---|---|---|
| JP | 55-105859 | 8/1980 |
| JP | 56022217 | 3/1981 |
| JP | 56-148721 | 11/1981 |
| JP | 56-159865 | 12/1981 |
| JP | 57-20962 | 2/1982 |
| JP | 57-020963 | 2/1982 |
| JP | 57-122063 | 7/1982 |
| JP | 57-158061 | 9/1982 |
| JP | 58-28650 | 6/1983 |
| JP | 59-072679 | 4/1984 |
| JP | 59-92456 | 5/1984 |
| JP | 59-98347 | 6/1984 |
| JP | 59-221870 | 12/1984 |
| JP | 60-093223 | 5/1985 |
| JP | 60212880 | 10/1985 |
| JP | 61-17279 | 1/1986 |
| JP | 61104461 | 5/1986 |
| JP | 61-160885 | 7/1986 |
| JP | 61-192083 | 8/1986 |
| JP | 63-21271 | 5/1988 |
| JP | 62020187 | 9/1989 |
| JP | 4-114377 | 4/1992 |
| JP | 7-6537 | 1/1995 |
| NL | 7811293 | 7/1980 |
| NL | 7811118 | 9/1980 |

OTHER PUBLICATIONS

Bisson, et al., *Advanced Bearing Technology,* NASA Scientific and Technical Information Div. (1964), entire document with pp. 1–511.

Castelli, et al., *Transient Dynamics of a Tilting Pad Gas Bearing System,* Transactions of the ASME (Oct. 1967), pp. 499–509.

Castelli, et al., *Semi–Implicit Numerical Methods for Treating the Time–Transient Gas–Lubrication Equation,* Transactions of the ASME (Jan. 1968), pp. 153–156.

Constantinescu, *Consideratii Asupra Calculului Lagarelor de Alungire Infinita Lubrifacte cu Gaze Compuse din Suprafete Plane,* Studii si Cercetari de Mecanica Aplicata, vol. VII, No. 3 (1956), pp. 741–771.

Constantinescu, *Calculul Lagarelor Fara Joc Radial Supuse la Forte Si Viteze Variable,* Studii si Cercetari de Mecanica Aplicata, vol. VIII, No. 3 (1957), pp. 789–904.

Deckert, et al., *Rails Defined by Etching,* IBM Technical Disclosure Bulletin, vol. 26, No. 10B (Mar. 1984), p. 5685.

Fuller, *General Review of Gas–Bearing Technology,* First International Symposium on Gas–Lubricated Bearings, Office of Naval Research—Dept. of the Navy (Oct. 26, 1959), pp. 1–29.

Fuller, D. *A Review of the State–of–the–art for the Design of Self-Acting Gas–Lubricated Bearings,* Transactions of the AMSE, Journal of Lubrication Technology vol. 91 (1969), pp. 1–16.

Gross, W., *A Gas Film Lubrication Study: Part I, Some Theoretical Analyses of Slider Bearings,* IBM Journal of Research and Development, vol. 3, No. 3 (Jul. 1959), pp. 237–255.

Gross, W., *Numerical Analysis of Gas Lubricating Films,* 1st Int'l Symposium on Gas Lubrication Bearings, Office of Naval Research—Dept. of Navy (Oct. 26, 1959), pp. 193–223.

Gross, W., *Gas Lubricated Bearings,* Applied Mechanics Reviews, vol. 15, No. 10 (Oct. 1962), pp. 765 769.

Gross, W., *Gas Lubrication,* International Science and Technology (Jun. 1963), pp. 32–39.

Gross, W., *Origins and Early Development of Air–Bearing Magnetic Heads for Disk–File Digital Storage Systems,* in Tribology and Mechanics of Magnetic Storage Devices, ASLE Special Publication (1984) pp. 63–71.

Harker, et al., *A Quarter Century of Disk File Innovation,* IBM Journal of Research and Development, vol. 25, No. 5 (Sep. 1981), pp. 677–689.

Kettleborough, *An Approximate Analytical Solution for the Stepped Bearing,* Journal of Applied Mechanics, vol. 28, Series E, No. 4 (Nov. 1961), pp. 507–510.

McKeown, P.A., *High Precision Manufacturing and the British Economy,* Proceedings of the Institute of Mechanical Engineers, vol. 200, No. B3 (1986), pp. 147–165.

McWhinney, N.J., *Trirail Slider with Low–Profile Center Rail,* IBM Technical Disclosure Bulletin (Aug. 1977), vol. 20, No. 3, p. 1202.

Mulvany; R.B., *Engineering Design of a Disk Storage Facility with Data Modules,* IBM Journal of Research and Development, vol. 18, No. 6 (Nov. 1974), pp. 489–505.

Nakanishi, T., *Narrow Track Magnetic Head Fabricated by Ion–Etching Method,* IEEE Transactions on Magnetics, vol. MAG–15, No. 3 (May 1979), pp. 1060–1064.

Nakanishi, T., et al., *Narrow Track Magnetic Head Fabricated by Ion–Etching,* Electrical Communication Laboratories Technical Journal, vol. 29, No. 3 (1980), pp. 385–397.

Pinkus, O. and Sternlicht, B., *Theory of Hydrodynamic Lubrication,* McGraw–Hill (1961) pp. 60–62.

Rayleigh, *Notes on the Theory of Lubrication,* Philosophical Magazine and Journal of Science, 6th Series (Jan. 1918), pp. 1–12.

Tagawa, N., et al., *Submicron Spacing of Negative Pressure Slider Bearing with Reverse Step Region,* C&C Systems Research Laboratories, NEC Corp. (1984), pp. 591–598.

Tagawa, N., *Submicron Spacing of Air–Lubricated Slider in a Disk with Swinging Arm Actuator,* IEEE Transactions on Magnetics, vol. MAG–17, No. 6 (1981), pp. 2745–2747.

Tagawa, N., *Optimum Design Consideration for Air–Lubricated Slider Bearings of Film Head,* NEC Research & Development, No. 68 (Jan. 1983), pp. 90–100.

Tagawa, N., *The Influences of Bleed Slot Depth and Width on Air–Lubricated Slider Bearing Static Flying Characteristics*, Transactions of the Japan Society of Mechanical Engineers (Series C), vol. 50, No. 449 (Jan. 1984), pp. 160–167.

Toshima, T., et al., *Magnetic Head Fabricated by Improved Ion Etching Method*, IEEE Transaction on Magnetics, vol. MAG–15, No. 6 (Nov. 1979), pp. 1637–1639.

Tang, T., *Dynamics of Air–Lubricated Slider Bearings for Noncontact Magnetic Recording*, Transactions of the ASME Journal of Lubrication Technology (Apr. 1971), pp. 272–278.

White, J.W., *Surface Roughness Effects on the Load Carrying Capacity of Very Thin Compressible Lubricating Films*, Journal of Lubrication Technology, vol. 102 (Oct. 1980), pp. 445–451.

White, J.W., *The Effect of Two Sided Surface Roughness on Ultra–Thin Gas Films*, Journal of Lubrication Technology, vol. 105 (Jan. 1983), pp. 131–137.

White, J.W., *Flying Characteristics of the "Zero–Load" Slider Bearing*, Transactions of the ASME, vol. 105 (Jul. 1983), pp. 484–490.

White, J.W., *Flying Characteristics of the 3370–Type Slider on a 5¼–Inch Disk—Part 1: Static Analysis*, Tribology and Mechanics of Magnetic Storage Systems, ASLE, vol. 1 (1984), ten pages.

White, J.W., *Flying Characteristics of the 3370–Type Slider on a 5¼–Inch Disk—Part II: Dynamic Analysis*, Tribology and Mechanics of Magnetic Storage Systems, ASLE, vol. 1 (1984), fifteen pages.

White, J.W., *An Air Bearing Slider with Uniform Flying Height and Fast Take–Off Characteristics*, Tribology and Mechanics of Magnetic and Optical Recording Systems, ASLE. vol. 3 (1986), pp. 95–101.

White, J.W., *Dynamic Response of the Transverse Pressure Contour Slider*, Tribology and Mechanics of Magnetic Storage Systems, STLE, vol. 4 (Oct. 1987), pp. 72–82.

Wildmann, et al., *Gas Lubricated Stepped Thrust Bearing—a Comprehensive Study*, Transactions of the ASME, Jounal of Basic Engineering, vol. 87, Series D (Mar. 1965), pp. 213–229.

Money, J.B., *Taper Flat Slider Design*, IBM Confidential Document (Nov. 8, 1972), 14 pages.

Garnier, M.F., *Air Bearing Specification, 337X, 338X*, IBM Engineering Specification (Sep. 22, 1987), 36 pages.

*Thin Film Head Slider Machining, 3370 Type Slider*, IBM (Not Dated), 1 page.

*ABS Artwork P/N 4512546, EC 443541*, IBM (Not Dated), 3 pages.

Garnier, M.F., *Apollo Slider Air Bearing Specification*, IBM (Nov. 24, 1976), 12 pages.

*Slider CBM, No. 1703800*, IBM (Jun. 11, 1975), 1 page.

*Blend Spec, Drawing No. 8002988–GPB*, Information Magnetic Corp. (Oct. 1, 1986), 1 page.

*Blend Spec, Drawing No. 8002988–GPC*, Information Magnetic Corp. (Oct. 1, 1986), 1 page.

*Slider, R/W, 'Y'—L.D. 816 TPI, Drawing No. 3013203*, Storage Technology Corp., Drawing No. 3010229, 1 page.

Noland, Roger D., *Slider, Servo, X Specification*, Storage Technology Corp. (Oct. 30, 1980), 1 page.

*Slider, 3X, Drawing No. 3054047 Rev. B*, Storage Tek [Storage Technology Corp.] (Mar. 1988), 1 page.

M. Akkok, C.E. Harkie, L.R. Gero and C.M. McC. Ettles, *A Comparison of Three Numerical Methods Used to Solve the High Bearing Number Reynolds Equation*, Tribology & Mechanics of Magnetic Storage Systems, vol. III, pp. 72–78 (1986).

P.E. Allaire and R.C. Benson, *A Rapid Solution Method for the Compressible Reynolds Equation in Magnetic Recording Applications*, Tribology & Mechanics of Magnetic Storage Systems, vol. IV, pp. 33–39 (1987).

K. Aruga, Y. Mizoshita, T. Yamada and S. Yoneoka, *Spacing Fluctuation of Flying Head Sliders in Track Accessing (Forced Vibration Analysis Using Finite Element Method*, Tribology & Mechanics of Magnetic Storage Systems, vol. III, pp. 79–86 (1986).

Bharat Bhushan, *Assessment of Accelerated Head–Wear Test Methods and Wear Mechanics*, Tribology & Mechanics of Magnetic Storage Systems, vol. II, pp. 101–111 (Oct. 1985).

G. Bouchard, D.B. Bogy and F.E. Talke, *On the Dynamics of Winchester and 3370–Type Sliders Used in Magnetic Recording Disk Files*, Tribology & Mechanics of Magnetic Storage Systems, pp. 85–89 (Oct. 1984).

G. Bouchard, D.B. Bogy and F.E. Talke, *Use of Doppler Anemometer for Studying In–Plane Motions of Sliders in Magnetic Disk Files*, Tribology & Mechanics of Magnetic Storage Systems, vol. II, pp. 87–92 (Oct. 1985).

R. K. Brunner, J. M. Harker, K. E. Houghton and A. G. Osterlund, *A Gas Film Lubrication Study: Part III, Experimental investigation of pivoted slider bearings*, IBM Journal of Research and Development, vol. 3, No. 3, pp. 260–274 (Jul. 1959).

V. N. Constantinescu, *Sur la probleme tridemensional de la lubrification aux gaz*, Revue de Méccanique Appliquée, vol. 1, No. 2, pp. 123–138, (1956).

Control Data Corporation, Press Release, *Control Data 3.5–Inch "Cricket" Winchester Features Thin–Film Heads, Plated Disks* (May 1983) (3 pages).

Control Data Corporation, Brochure, *Cricket Disk Drive Designed for Original Equipment Manufacturers (OEM)* (Apr. 1983) (2 pages).

G. D. Granzow and A.O. Lebeck, *An Improved One–Dimensional Foil Bearing Solution*, Tribology & Mechanics of Magnetic Storage Systems, pp. 54–58 (Oct. 1984).

C. Garcia–Suarez, D.B. Bogy and F.E. Talke, *Use of an Upwind Finite Element Scheme for Air–Bearing Calculations*, Tribology & Mechanics of Magnetic Storage Systems, pp. 90–96 (Oct. 1984).

Hans H. Gatzen and Gordon F. Hughes, *Flight Attitude and Takeoff/Landing Behavior of a Miniature Winchester Head for Rotary Actuators*, Tribology & Mechanics of Magnetic Storage Systems, vol. IV, pp. 133–137 (1987).

W. A. Gross, *Film Lubrication, IV. Compressible Lubrication of Infinitely Long Slider and Journal Bearings*, pp. 48, 52, 57–58, 60, 62, 104–105 (IBM Research Paper No. RJ–RR–117–4, Jun. 25, 1958). (excerpts, 10 pages).

W. A. Gross, *Use of Capacity–Controlled rf Energized Ionization Transducer for Balancing Rotors*, The Review of Scientific Instruments, vol. 30, No. 7, pp. 522–523 (Jul. 1959).

Juan C. Heinrich, *Analysis of Self–Acting Foil Bearings: A Finite Element Approach*, Tribology & Mechanics of Magnetic Storage Systems, vol. III, pp. 152–159 (1986).

Ferdinand Hendricks, *A Design Tool for Steady Gas Bearings Using Finite Elements, The APL Language and Delauay Triangulation,* Tribology & Mechanics of Magnetic Storage Systems, vol. V, pp. 124–129 (1988).

A. R. Kumaran and Y. S. Chang, *Effect of Head/Disc Imperfections on Gas Lubricated Slider Performance,* IEEE (1985) (1 page).

W. A. Michael, *A Gas Film Lubrication Study, Part II, Numerical Solution of the Reynolds Equation for Finite Slider Bearings,* IBM Journal of Research and Development, vol. 3, No. 3, pp. 256–259 (Jul. 1959).

H. S. Nishihira, L. K. Dorius and S. A. Bolasna, *Performance Characteristics of the IBM 3380 K Air Bearing Design,* Tribology & Mechanics of Magnetic Storage Systems, vol. V, pp. 117–123 (1988).

O. J. Ruiz and D. B. Bogy, *A Comparison of Slider Bearing Simulations Using Different Models,* IEEE Transactions on Magnetics, vol. 24, No. 6, pp. 2754–2756 (Nov. 1988).

S. Suzuki, J. Toriu, C. Fukao and H. Oda, *High Density Magnetic Recording Heads for Disk,* IEEE Transactions on Magnetics, vol. 17, No. 6, pp. 2899–2901 (Nov. 1981).

Ta–Chang Fu and David .B. Bogy, *Dynamic Load Head–Disk Interface Durability of 50 Percent Sliders and Polished Disks,* IEEE Transactions of Magnetics, vol. 32, No. 5, pp. 3747–3749 (Sep. 1996).

T. Yamada, Y. Mizoshita and K. Aruga, *Spacing Fluctuation of Flying Head Sliders in Track Accessing (Measurement Using Optical Interferometer),* Tribology & Mechanics of Magnetic Storage Systems, vol. III, pp. 87–94 (1986).

Seiji Yoneoka, Takeshi Ooe and Minoru Takahashi, *Design Considerations for Negative Pressure Head Sliders,* Fujitsu Sci. Tech. J., vol. 21, No. 1, pp. 39–49 (Mar. 1985).

*3.5" Winchester Uses Plated Media, Thin Film Heads,* Digital Design, vol. 13, No. 8, p. 18 (Aug. 1983).

*CDC is First U.S. Manufacturer to Debut 3.5–Inch Winchester,* ISO World (May 30, 1983), 1 page.

*CDC to Announce 3½–in. Winchester; Floppy Drive to Follow,* Mini–Micro World, pp. 32, 34 (May 1983).

Alan Alper, *CDC to Withdraw 3.5–In. Winchester,* Electronic News, vol. 29, No. 1474, pp. 27–28 & 89 (Dec. 5, 1983).

D. B. Bogy, Q. H. Zeng and L. S. Chen, *Air–Bearing Designs for Stable Performance in Proximity Magnetic Recording,* Advances in Information Storage Systems, vol. 9, pp. 121–132 (May 21, 1997, revised Jan. 19, 1998).

T. Chikazawa, M. Hill, T. Matsumoto, Y. Kubota and M. Take, *Flying Attitude of Magnetic Recording Heads in Contact with Disks,* Advances in Information Storage Systems, vol. 9, pp. 133–141 (1998).

Zhisheng Deng, Yasunaga Mitsuya and Masahiro Ohka, *Flying Characteristics of Head Sliders when Traveling Over Magnetic Disk Surfaces,* Advances in Information Storage Systems, vol. 9, pp. 77–91 (1998).

Shigehisa Fukui and Kiyomi Yamane, *Monte Carlo Direct Simulations of Step–Type Gas Bearings with Nanometer Spacings,* Advances in Information Storage Systems, vol. 9, pp. 109–119 (1998).

Cal Edward Hardie, *The Flying Characteristics of the Membrane Slider Bearings,* Ph. D. dissertation, Rensselaer Polytechnic Institute (May 1987), 239 pages.

Satomitsu Imai, Toshihisa Okazaki and Kenji Mori, *Flutter Reduction by Centrifugal Airflow for High–Rotation–Speed Disks,* Advances in Information Storage Systems, vol. 9, pp. 5–17 (1998).

T.G. Jeong, J.I. Chun, C.C. Chung, Y.K. Byun and K.C. Ro, *Measurement Technique for Dynamic Characteristics of HDD Head–Suspension Assembly in Normal Operating Conditions,* Advances in Information Storage Systems, vol. 9, pp. 47–61 (1998).

Toshinori Kai, Yasuo Yoshida, Shoji Nakagawa, Yuji Omata, Kazuo Nakamura and Nobuyuki Kaminaka, *Thin–Film Magnetic Head for Rigid Disk Drives,* National Technical Report, vol. 31, No. 2, pp. 12–21 (Apr. 1985) in Japanese with 17–page English translation.

Bo Liu, Wei Hua, Yaolong Zhu and Teck Seng Low, *Engineering Performance Evaluation of Tri–Pad Slider for Proximity Recording,* Advances in Information Storage Systems, vol. 9, pp. 143–156 (1998).

Yasunaga Mitsuya, Mikihita Yoshioka and Kenji Nakayama, *Head–Medium Spacing Measurements Using a Phase Comparison Between Two Fringe Patterns Formed by Michelson Laser Interferometry Through a Glass Disk,* Advances in Information Storage Systems, vol. 9, pp. 63–75 (1998).

Matthew Arnold O'Hara, *Optimization of Hard Drive Components,* Ph. D dissertation, University of California, Berkeley (Spring 1997), 167 pages.

Mike Seither, *CDC Tries to Recover Lost Ground with New 3½–inch Winchesters,* Mini–Micro Systems, pp. 15–16 (Apr. 1988).

Katsuyuki Tanaka, Yoshinori Takeuchi, Yokuo Saitoh and Toshiko Odaka, *Preliminary Study on Some Shape and Characteristics of Air Bearing Slider with Uniform Flying Height for Magnetic Disc Drive with Swing–Type Actuator,* Advances in Information Storage Systems, vol. 9, pp. 93–108 (1998).

K. L. Deckert, S.A. Bolasna and H.S. Nishihira, *Statistics of Slider Bearing Flying Height,* Tribology & Mechanics of Magnetic Storage Systems, vol. IV, pp. 1–5 (1987).

Statement of Seagate Technology, Inc. pursuant to 35 U.S.C. § 282 and two exhibits (Feb. 5, 1999) (35 pages).

Memorandum of Points and Authorities in Support of Plaintiff's Motions for Preliminary Injunction and Expedited Discovery (Apr. 10, 1997) (28 pages).

Declaration of William J. Bohler and Exhibits A and B (Mar. 18, 1997) (114 pages).

Declaration of Robert E. Chapin in Support of Seagate Technologies, Inc.'s Opposition to Plaintiff's Motion for Preliminary Injunction and Exhibit A (Jun. 4, 1997) (162 pages).

Declaration of Edward P. Heller in Support of Seagate Technologies, Inc.'s Opposition to Plaintiff's Motion for Preliminary Injunction (Jun. 4, 1997) (2 pages).

Declaration of Steve Holmes in Support of Seagate Response in Oppposition Plaintiff's Motion for Preliminary Injunction (Jun. 4, 1997) (2 pages).

Declaration of Brian J. Keating in Support of Seagate Technology, Inc.'s Opposition to Plaintiff's Motion for Preliminary Injunction and Exhibits A through P) (Jun. 4, 1998) (421 pages).

Declaration of Karl Limbach in Support of Seagate Technology, Inc.'s Opposition to Motion for Preliminary Injunction and Exhibits A and B (Jun. 5, 1997) (10 pages).

Plaintiff White's Memorandum in Reply to Defendant Seagate Technology Inc.'s Memorandum in Opposition to Plaintiff's Motion for Preliminary Injunction and Attachment A (Jun. 16, 1997) (22 pages).

Supplemental Declaration of James W. White and Exhibits A through G (Jun. 16, 1997) (33 pages).

Supplemental Declaration of Darin J. Gibby and Exhibits A through P (Jun. 16, 1997) (262 pages).
Second Supplemental Declaration of William J. Bohler in Support of Plaintiff's Motion for Preliminary Injunction and Exhibits A through C (Jun. 16, 1997) (9 pages).
Order re Plaintiff's Motion for Preliminary Injunction (Jul. 1, 1997) (13 pages).
Defendant Seagate's Response Chart for the '519 Patent and Exhibits A through F (Jan. 12, 1998) (159 pages).
Joint Claims Construction Statement (Feb. 9, 1998) (12 pages).
Declaration of Darin J. Gibby in Support of Plaintiff's Claims Construction Brief and Exhibits A through J (Feb. 23, 1998) (267 pages).
Defendant Seagate Technology, Inc.'s Responsive Claim Construction Brief (Mar. 6, 1998) (27 pages).
Declaration of Donald Banner in Support of Defendant Seagate Technology, Inc.'s Responsive Claim Construction Brief and Exhibit A (Mar. 3, 1998) (22 pages).
Declaration of Brian J. Keating in Support of Seagate Technology, Inc.'s Responsive Claim Construction Brief and Exhibits A through J (Mar. 5, 1998) (195 pages).
Plaintiff's Reply to Defendant's Claims Construction Brief and Exhibits A and B (Mar. 13, 1998) (28 pages).
Supplemental Declaration of Robert L. Harmon in Support of Plaintiff's Claims Construction Brief (Mar. 13, 1998) (3 pages).
Supplemental Declaration of James W. White in Support of Plaintiff's Claims Construction Brief and Exhibits A and B (Mar. 18, 1998) (9 pages).
Plaintiff's Revised Definition of Transverse Pressurized Contour (Mar. 27, 1998) (3 pages).
Defendant's Proposed Construction of Transverse Pressurization Contour and Exhibit A (Mar. 30, 1998) (5 pages).
Plaintiff's Response to Defendant's Proposed Construction of Transverse Pressurization Contour (Mar. 31, 1998) (2 pages).
Order re Claim Construction (Apr. 27, 1998) (16 pages).
Expedited Motion for Leave to File a Motion for Reconsideration and Exhibit A, Appendix 1 and Appendix 2 (Jun. 2, 1998) (29 pages).
Defendant Seagate's Motion for Partial Summary Judgment re the Anticipation of Claims 1 and 11 of the '996 Patent and Claims 18, 26 and 46 of the '519 Patent (Jul. 2, 1998) (28 pages).
Declaration of Roger S. Sampson in Support of Defendant Seagate's Motion for Partial Summary Judgment re the Anticipation of Claims 1 and 11 of the '996 Patent and Claims 18, 26 and 46 of the '519 Patent and Exhibits A through R (Jul. 2, 1998) (244 pages).
Separate Statement of Undisputed Facts Supporting Defendant Seagate's Motion for Partial Summary Judgment re the Anticipation of Claims 1 and 11 of the '996 Patent and Claims 18, 26 and 46 of the '519 Patent (Jul. 2, 1998) (23 pages).
Plaintiff's Opposition to Defendant's Motion for Partial Summary Judgment Regarding the Anticipation of Claims 1 and 11 of the '996 Patent and Claim 18, 26, and 46 of the '519 Patent (Jul. 21, 1998) (22 pages).
Plaintiff James White's Separate Statement of Disputed Facts in Opposition to Defendant Seagate's Motion for Partial Summary Judgment re the Anticipation of Claims 1 and 11 of the '996 Patent and Claims 18, 26 and 46 of the '519 Patent (Jul. 21, 1998) (19 pages).
Declaration of Darin J. Gibby in Opposition to Defendant's Motion for Partial Summary Judgment Regarding the Anticipation of Claims 1 and 11 of the '996 Patent and Claim 18, 26, and 46 of the '519 Patent and Exhibits A through G (Jul. 21, 1998) (156 pages).
Declaration of James W. White in Opposition to Defendant's Motion for Partial Summary Judgment Regarding the Anticipation of Claims 1 and 11 of the '996 Patent and Claim 18, 26, and 46 of the '519 Patent and Exhibits 1 through 3 (Jul. 21, 1998) (34 pages).
Reply Brief Supporting Seagate Technology Inc.'s Motion for Partial Summary Judgment of Invalidity of Claims 1 and 11 of the '996 Patent and Claims 18, 26 and 46 of the '519 Patent as Anticipated (Jul. 27, 1998) (18 pages).
Declaration of Kenneth E. Haughton in Support of Seagate Technology Inc.'s Motion for Summary Judgment of Invalidity of White Claims as Anticipated (Jul. 19, 1998) (23 pages).
Order re Defendant's Motion for Summary Judgment [(Aug. 4, 1998) (7 pages).
Seagate Technology, Inc.'s Notice of Motion and Motion for Partial Summary Judgment of Invalidity of Certain Claims of U.S. Patent No. 4,870,519 for Improper Broadening under 35 U.S.C. § § 305 and Indefiniteness under 35 U.S.C. § 112 (Dec. 18, 1998) (20 pages).
Declaration of Gerald T. Sekimura in Support of Seagate Technology, Inc.'s Motion for Partial Summary Judgment of Invalidity of Certain Claims of U.S. Patent No. 4,870,519 for Improper Broadening under 35 U.S.C. § 305 and Indefiniteness under 35 U.S.C. § 112 and Exhibits 1 through 17 (Dec. 18, 1998) (127 pages).
Order re Defendant's Motion for Partial Summary Judgment of Invalidity of Certain Claims of U.S. Patent No. 4,870,519 for Improper Broadening under 35 U.S.C. § 305 and Indefiniteness under 35 U.S.C. § 112 (Jan. 29, 1999) (3 pages).
Declaration of Terrence P. McMahon in Support of Seagate's Motion for Summary Judgment of Patent Invalidity under 35 U.S.C. § 112, ¶ 1 and Exhibits A through I (Dec. 18, 1998) (87 pages).
Order re Motion for Summary Judgment of Patent Invalidity under 35 U.S.C. § 112, ¶ 1 (Jan. 29, 1999) (11 pages).
Declaration of Donald W. Banner in Support of Defendant Seagate Technology Inc.'s Motion for Summary Judgment on the Issue of Inequitable Conduct and Exhibit A (Jan. 6, 1999) (19 pages).
Order re Defendant's Motion for Summary Judgment of Inequitable Conduct (Jan. 29, 1999) (11 pages).
Bharat Bhushan, Tribology and Mechanics of Magnetic Storage Devices, pp. xi–xx (Table of contents) (Springer–Verlag 1990, 1996).
Electrical Communications Laboratories Nippon Telegraph and Telephone Public Corporation, Electrical Communication Laboratories Technical Journal, vol. 28, No. 10, pp. 2229–2261 (1979).
Electrical Communications Laboratories Nippon Telegraph and Telephone Public Corporation, Electrical Communication Laboratories Technical Journal, vol. 29; No. 3, pp. 385–397 (1980).
Bharat Bhushan, et al., Tribology and Mechanics of Magnetic Storage Devices, Table of contents (Oct. 1984).
Bharat Bhushan, et al., Tribology and Mechanics of Magnetic Storage Devices, vol. III, Table of contents, (1986).
Bharat Bhushan, et al., Tribology and Mechanics of Magnetic Storage Devices, vol. IV Table of contents (Oct. 1987).

English translation of Japanese Patent Document 1985–7522 (Sho 60–7522), "Flotation–Type Magnetic Head" (Jan. 21, 1981).

Bernard J.Hamrock, *Fundamentals of Fluid Film Lubrication*, pp. xi–xix (Table of contents), 168–69, 186–87, 194–99, 204–05, 218–19, 328–29, 342–343 (NASA Reference Publication 1255, 1991).

Dennis Waid "Pico Comes of Age," Idema Insight, vol. X, No. 3, pp. 5, 21 (May/Jun. 1997).

J. Antman "Typical Storage Tek (RMMI) Slider Design Practiced Prior to (1983)," (Feb. 1993).

Benson, R.C., et al., *The Stability of a Slider Bearing During Transition from Hydrodynamic to Boundary Lubrication*, Tribology and Mechanics of Magnetic Storage Systems, vol. 4 (1987).

Bhushan, Bharat, *Curriculum Vita* (67 pages).

Bogy, David B., *Curriculum Vita* (46 pages).

Brenner, H., *The Stokes Resistence of an Arbitrary Particle*, Chemical Engineering Science, vol. 18, pp. 1–25 (Pergamon Press Ltd., 1963).

Brenner, H., *The Stokes Resistance of an Arbitrary Particle—II An extension*, Chemical Engineering Science, vol. 19, pp. 599–629 (Pergamon Press, 1964).

Briggs, J., *Force Identification Using Extracted Modal Parameters, with Applications to Glide Height Testing of Computer Hard Disks*, Massachusetts Institute of Technology (1991).

Burgdorfer, A., *The Influence of the Molecular Mean Free Path on the Performance of the Hydrodynamic Gas Lubricated Bearings*, Transactions of the ASME, Journal of Basic Engineering, pp. 94–100 (Mar. 1959).

Castelli, V. & Pirvics, J., *Review of Numerical Methods in Gas Bearing Film Analysis*, Transactions of the ASME, Journal of Lubrication Technology, pp. 777–792 (Oct. 1968).

Cha, E., *Numerical Analysis of Head–Disk Assembly Dynamics for Shaped–Rail Sliders with Sub–Ambient Pressure Regions*, University of California, Berkeley (1993).

Cha, E. & Bogy, D. B., *A Numerical Scheme for Static and Dynamic Simulation of Subambient Pressure Shaped Rail Sliders*, Transactions of the ASME, vol. 117, pp. 36–46 (Jan. 1995).

Chu, W. H., et al., *Improved Contrast Ratio of Displays Based on Scattering*, IBM Technical Disclosure Bulletin, vol. 20, No. 3, p. 1203 (Aug. 1977).

Claeys, I. L. & Brady, J. F., *Lubrication Singularities of the Grand Resistance Tensor for Two Arbitrary Particles*, PCH Physicochemical Hydrodynamics, vol. 11, No. 3, pp. 261–293 (1989).

Comello, V., *Magnetic Storage Research Aiming at High Areal Densities*, R&D Magazine, pp. 14–19 (Dec. 1998).

*Control Data's 'Cricket' Winchester Stores 6 Million Bytes* (1993).

Cox, R. G., *The Motion of Suspended Particles Almost in Contact*, Int. J. Multiphase Flow, vol. 1, pp. 343–371 (Pergamon Press, 1974).

Deckert, K. L., *Computer–aided Design of Slider Beraings in Magnetic Disk Files*, IBM J. Res. Develop. vol. 34, No. 5, pp. 650–667 (Sep. 1990).

Eshel, A., *Effects of Fluid Inertia on Hydrostatic Foil Bearings*, Tribology and Mechanics of Magnetic Storage Systems, vol. 1, pp. 59–62 (1984).

Fuller, Dudley, D., Theory and Practice of Lubrication for Engineers, John Wiley & Sons, Inc. (New York, 1956, Second Printing 1965).

Garcia–Suarez, C., et al., *Use of an Upwind Finite Element Scheme for Air–Bearing Calculations*, Tribology and Mechanics of Magnetic Storage Systems, vol. 1 pp. 90–96 (1984).

Goldman, A. J., et al., *Slow Viscous Motion of a Sphere Parallel to a Plane Wall—I. Motion Through a Quiescent Fluid*, Chemical Engineering Science, vol. 22, pp. 637–651 (Pergamon Press, Ltd., 1967).

Gross, William A., *Curriculum Vita* (14 pages).

Gross, W. A., et al., *Fluid Film Lubrication*, Wiley–Interscience Publication, pp. 97–106 (1980).

Gross, W. A., Gas Film Lubrication, John Wiley and Sons, Inc. (New York, 1962).

Hardie, C., et al., *Analysis and Performance Characteristics of the Seagate Advanced Air Bearing Slider*, IEEE Transactions on Magnetics, vol. 30, No. 2 (Mar. 1994) (2 pages).

Heath, J.S., *Design of a Swinging Arm Actuator for a Disk File*, IBM J. Res. Development, pp. 389–397 (Jul. 1976).

Jeong, T.G., *Slider–disk Interactions During Dynamic Load–Unload in Magnetic Recording Disk Drives*, Ph. D. dissertation, University of California, Berkeley (1991).

Kaneko, R., et al., *Flying Heads with Sub–micron Spacing for Magnetic Recording Discs*, Tribology International, pp. 293–300 (Oct. 1981).

Kaneko, R., et al., *Hydrodynamic Aspects and Design of Rotating Disk Mechanism*, (Electrical Communications Laboratory Technical Journal, vol. 26, No. 2, pp. 563–583 (1997). Japanese with English translation.

Kaneko, R., Yoshii, S., *3.2G Byte Multi–Device Disk Storage Development*, Electrical Communications Laboratory Technical Journal, vol. 31, No. 1, pp. 241–247 (1982). Japanese with English translation.

Kita, T., et al., *Wear of the Flying Head of a Magnetic Disk File in Mixed Lubrication*, Tribology of Mechanics of Magnetic Storage Systems, vol. 1, pp. 35–40 (1984).

Klaus, E.E., *A Study of the Stability of Magnetic Tape Lubricants*, Tribology and Mechanics of Magnetic Storage Systems, vol. 3, pp. 24–30 (1986).

Langlois, W. E., *The Dynamical Equations Governing a Lubricating Film Consisting of a Gas Film Overlying a Liquid Film*, IBM Journal of Research and Development, vol. 29, No. 1, pp. 2–10 (Jan. 1985).

Lauer, J. L., *Friction Polymers*, Tribology and Mechanics of Magnetic Storage Systems, vol. 3, pp. 14–23 (1986).

Lennemann, E., *Aerodynamic Aspects of Disk Files*, IBM Journal of Research and Development, pp. 480–488 (Nov. 1974).

McKeown, P. A., *High Precision Manufacturing and the British Economy*, Proceedings of the Institute of Mechanical Engineers, vol. 200 (1986) (2 pages).

Nakanishi, T., et al., *Narrow Track Magnetic Head Fabricated by Ion–Etching*, Electrical Communication Laboratories Technical Journal, vol. 29 No. 3. (1980). Japanese with English translation.

Nakanishi, T., et al., *Magnetic Recording Head for an 800 Megabyte Disk Drive*, Electrical Communication Laboratories Technical Journal, vol. 28 No. 10, pp. 2229–2261 (1979). Japanese with English translation.

Nguyen, S. H., *p–Version Incompressible Lubrication Finite Element Analysis of Large Width Bearings,* Transactions of the ASME, Journal of Tribology; vol. 113, pp. 116–119 (Jan. 1991).

Ono, Kyusoke, *Advances in Information Storage System—Preface of Volumes 9 and 10,* source unknown (3 pages).

Pinkus, O., *The Reynolds Centennial: A Brief History of the Theory of Hydrodynamic Lubrication,* Transactions of the ASME, Journal of Tribology, vol. 109, pp. 2–20 (Jan. 1987).

Reddi, M. M., *Finite–Element Solution of the Incompressible Lubrication Problem,* Transactions of the ASME, Journal of Lubrication Technology, pp. 524–533 (Jul. 1969).

Reddi, M. M., & Chu, T. Y., *Finite Element Solution of the Steady–State Compressible Lubrication Problem,* Transactions of the ASME, Journal of Lubrication Technology, pp. 495–503 (Jul. 1970).

Sakai, K., et al., *Clearance Characteristics Between Magnetic Tapes and Heads of Video Cassette Recorders,* Tribology and Mechanics of Magnetic Storage Systems, vol. 4, pp. 61–67 (1987).

Smith, P. W., & Iwan, W. D., *Dynamic Figures of Merit for the Design of Gas–Lubricated Slider Bearings,* Adv. Info. Storage Syst., vol. 3, pp. 41–53 (1991).

Tagawa, N., *Submicron Spacing of Air–Lubricated Slider in a Disk File with Swinging Arm Actuator,* NEC Journal of Research & Development, No. 64, pp. 26–32 (Jan. 1982).

Talke, F. E., et al., *A Study of Eastohydrodynamic Lubrication Between a Magnetic Recording Head on a Rotating Flexible Disk,* Tribology and Mechanics of Magnetic Storage Systems, vol. 1, pp. 107–114 (1984).

Tanaka, K., et al., *Some Unique Phenomena of Negative Pressure Type Slider with Reverse Step Bearings,* Tribology and Mechanics of Magnetic Storage Systems, vol. 4, pp. 21–25 (1987).

Tonder, K., *Roughness Effects on Thin–Film Gas Lubrication—A State–of–the–Art Review,* Tribology and Mechanics of Magnetic Storage Systems, pp. 126–131 (1984).

White, James W., *Publications and Presentations Given by Dr. James W. White* (1995) (5 pages).

White, J. W., & Nigam, A., *A Factored Implicit Scheme for the Numerical Solution for the Reynolds Equation at Very Low Spacing,* Transactions of the ASME, Journal of Lubrication Technology, vol. 102, pp. 80–85 (Jan. 1980).

White, J. W., *Dynamic Simulation of the Zero–Load Slider Bearing,* IEEE Transactions on Magnetics, vol. Mag–19, No. 5, pp. 1668–1770 (Sep. 1983).

White, J. W., *On the Design of Low Flying Heads for Floppy Disk Magnetic Recording,* Tribology and Mechanics of Magnetic Storage Systems, pp. 126–131 (1984).

White, J. W., et al., *An Inverse Procedure for the Air Bearing Design of a Pair of Opposed Magnetic Heads in a Floppy Disk Drive,* Tribology and Mechanics of Magnetic Storage Systems, vol. 3, pp. 138–143 (1986).

White, J. W., *A Study of Low Flying Height Heads for Stretched Surface Recording,* Tribology and Mechanics of Magnetic Storage Systems, vol. 4, pp. 12–20 (1987).

White, J. W., & Ponnaganti, V., *Non–Linear Air Bearing Dynamics of a Six Degrees of Freedom Magnetic Recording Slider with Head–Disk Contact/Impact.* Fourth Joint MMM–Intermag Conference. (Jul. 12–15, 1988) (3 pages).

White, J. W., *The Transverse Pressure Contour Slider: Flying Characteristics and Comparisons with Taper–Flat and Cross–Cut Type Sliders.,* Adv. Info. Storage Syst., vol. 3, pp. 1–14 (1991).

White, J. W., *The Complexity of Analysis and the Challenge of Air–Bearing Design at Flying Heights of Three Microinches,* Adv. Info. Storage Syst., vol. 5, pp. 409–434 (1993).

White, J. W., *Flying Characteristics of the Transverse and Negative Pressure Contour ("TNP") Slider Air Bearing,* Journal of Tribology, vol. 119 at 241 (Apr. 1997) (9 pages).

Yeack–Scranton, C. E., et al., *An Active Slider for Practical Contact Recording,* IEEE Transactions on Magnetics, vol. 26, No. 5, pp. 2478–2483 (Sep. 1990).

Notice of Motion and Motion by Seagate for Order re: Participation in Reexamination (Mar. 26, 1996) (5 pages).

Seagate Technology, Inc.'s Memorandum in Opposition to Plaintiff's Motion for Preliminary Injunction (Jun. 6, 1997) (30 pages).

Seagate's Reply on Motion for Summary Judgment of Invalidity of Magnetic Recording System (Oct. 31, 1997) (7 pages).

Defendant Seagate Technology Inc.'s Claim Construction Statement for U.S. Patent No. 4,870,519 and Exhibits A through D (Jan. 12, 1998) (109 pages).

Expert statement of Bharat Bhushan and Exhibits 1 through 5 (Jan. 12, 1999) (94 pages).

Statement of William A. Gross, Expert Witness for Seagate Technology, Inc. and Exhibits 1 and 2 (Jan. 18, 1999) (31 pages).

Seagate Remarks for Reexamination 90/003,639 & 90/003,735 Patent No. 4,870,519 (13 pages).

Tagawa, "Submicron Spacing of Negative Pressure Slider Bearings for Thin Film Head" (1983).

J.W. White, "An Air Bearing Slider with Uniform Flying Height and Fast Take–Off Characteristics", *Tribology and Mechanics of Magnetic Storage Systems,* vol. III, pp. 85–101 (Oct. 1986).

J.W. White, "A Uniform Flying Height Rotary Actuated Air Bearing Slider", *IEEE Trans. on Magnetics,* (Sep. 1986).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 8, 9, 16–18, 21–23, 26, 34–65, 74–92, 124–128 and 131 is confirmed.

Claims 1, 2, 5, 6, 13–15, 19, 27–33, 66–73, 93–123, 129, 130, 132 and 133 are cancelled.

* * * * *